(12) United States Patent
Sakakibara

(10) Patent No.: US 10,171,005 B2
(45) Date of Patent: Jan. 1, 2019

(54) INVERTER CONTROL DEVICE

(71) Applicant: DAIKIN INDUSTRIES, LTD., Osaka-Shi, Osaka (JP)

(72) Inventor: Kenichi Sakakibara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/558,904

(22) PCT Filed: Mar. 16, 2016

(86) PCT No.: PCT/JP2016/058237
§ 371 (c)(1),
(2) Date: Sep. 15, 2017

(87) PCT Pub. No.: WO2016/148163
PCT Pub. Date: Sep. 22, 2016

(65) Prior Publication Data
US 2018/0091061 A1 Mar. 29, 2018

(30) Foreign Application Priority Data

Mar. 18, 2015 (JP) .................. 2015-054451

(51) Int. Cl.
*H02M 7/5395* (2006.01)
*H02M 5/458* (2006.01)
(Continued)

(52) U.S. Cl.
CPC ........... *H02M 5/458* (2013.01); *H02M 1/096* (2013.01); *H02M 7/12* (2013.01); *H02M 7/48* (2013.01)

(58) Field of Classification Search
CPC ...... H02M 5/45; H02M 5/4585; H02M 5/451; H02M 5/452; H02M 7/48; H02M 7/53;
(Continued)

(56) References Cited

U.S. PATENT DOCUMENTS 9,065,353 B2 6/2015 Sakakibara
9,075,089 B2* 7/2015 Sakakibara ............. H02M 1/44
(Continued)

FOREIGN PATENT DOCUMENTS

EP 2 302 779 A1 3/2011
JP 3-230767 A 10/1991
(Continued)

OTHER PUBLICATIONS

Fujita et al., "Application and Development of the Three Phase Indirect Matrix Converter for Air Conditioners", The Institute of Electrical Engineers of Japan, The papers of Joint Technical Meeting on Semiconductor Power Converter/Vehicle Technology/Home and Consumer Appliances, SPC-12-174/VT-12-025/HCA-12-059, IEE Japan 2012, Dec. 6, 2012, vol. 20, pp. 31-36.
(Continued)

*Primary Examiner* — Gary L Laxton
(74) *Attorney, Agent, or Firm* — Birch, Stewart, Kolasch & Birch, LLP

(57) ABSTRACT

In a first section including a point of time when sums of periods while upper arm-side switches in a pair of current paths of a voltage source inverter conduct in one cycle of a carrier are equal to each other at zero, a first voltage command group corresponds to switching signals in which a period while the upper arm-side switches in all of the current paths are nonconductive in this one cycle is adjacently sandwiched by a pair of periods while all of the upper arm-side switches in the pair of current paths are nonconductive and other upper-arm side switch conducts.

8 Claims, 10 Drawing Sheets

(51) Int. Cl.
  *H02M 7/12* (2006.01)
  *H02M 7/48* (2007.01)
  *H02M 1/096* (2006.01)
  H02M 1/084 (2006.01)
  H02M 1/088 (2006.01)

(58) Field of Classification Search
  CPC ........ H02M 5/40; H02M 5/42; H02M 7/5387;
       H02M 7/5395; H02M 7/53873; H02M
       7/53875; H02M 5/458; H02M 1/084;
           H02M 1/0845; H02M 1/088
  See application file for complete search history.

(56) References Cited

U.S. PATENT DOCUMENTS

| | | | |
|---|---|---|---|
| 9,444,360 B2 | 9/2016 | Sakakibara | |
| 2009/0175059 A1 | 7/2009 | Sakakibara | |
| 2010/0213769 A1* | 8/2010 | Sakakibara | ........... H02M 5/297 307/82 |
| 2013/0181695 A1* | 7/2013 | Sakakibara | ............. H02M 1/44 324/76.11 |

FOREIGN PATENT DOCUMENTS

| | | |
|---|---|---|
| JP | 2008-048504 A | 2/2008 |
| JP | 4049189 B2 | 2/2008 |
| JP | 4135026 B2 | 8/2008 |
| JP | 2011-193678 A | 9/2011 |
| JP | 5167869 B2 | 9/2011 |
| JP | 2013-93992 A | 5/2013 |

OTHER PUBLICATIONS

International Search Report for PCT/JP2016/058237 dated Jun. 14, 2016.
Ohnuma et al., "Circuit Configuration and Control Strategy of single-to-three Phase Power Converter with Active Buffer and Charge Circuit", The 2010 Annual Meeting of the Institute of Electrical Engineers of Japan, 4-057, 2010, total 5 pages.
Wei et al., "A Novel Matrix Converter Topology With Simple Commutation", IEEE IAS2001, 2001, vol. 9, pp. 1749-1754.
Extended European Search Report dated Nov. 22, 2018 in corresponding European Patent Application No. 16764992.0.

* cited by examiner

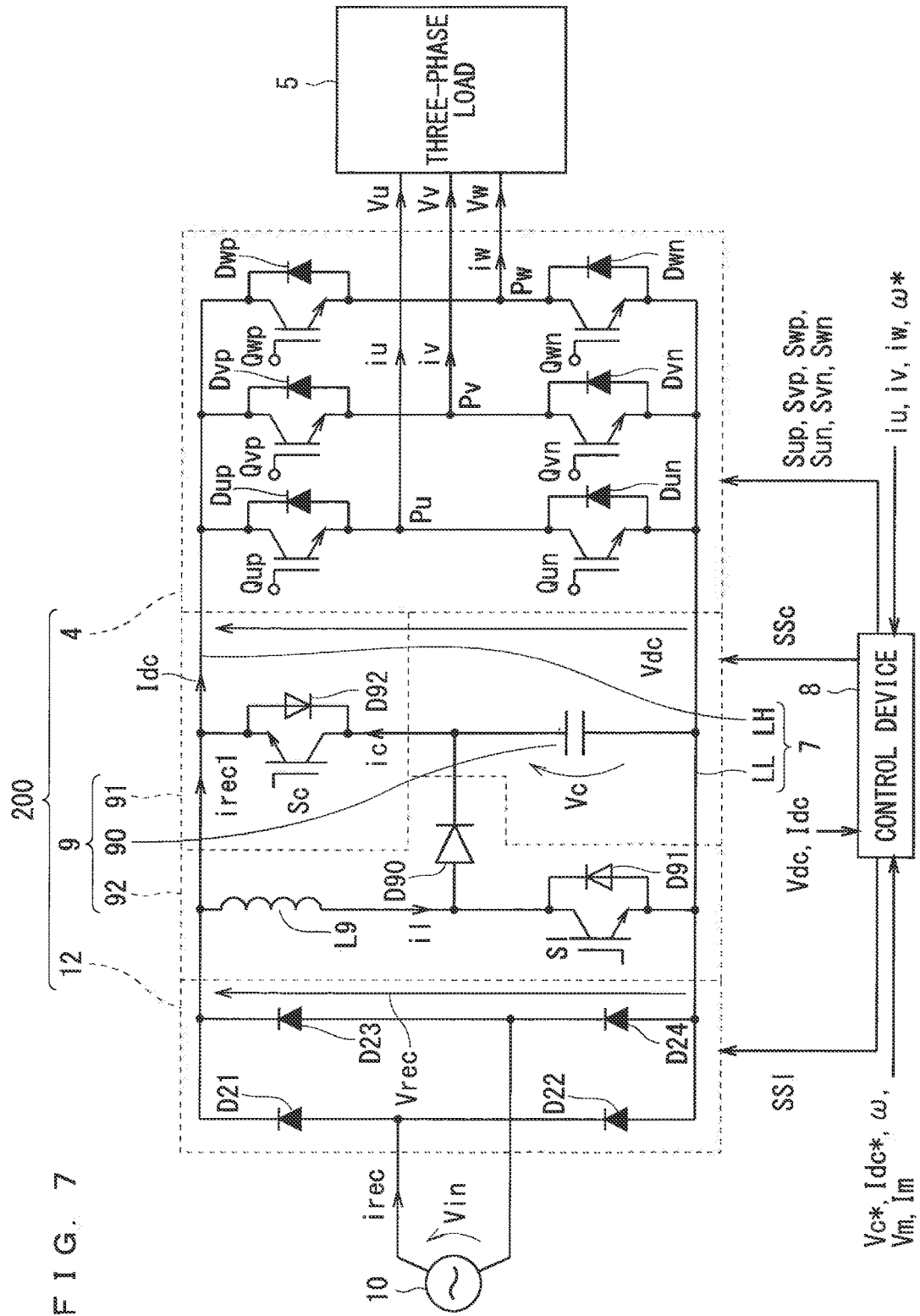
F I G. 7

INVERTER CONTROL DEVICE

TECHNICAL FIELD

The present invention relates to a technology for controlling an inverter.

BACKGROUND ART

As a mode of directly obtaining an AC output voltage from an AC power supply, a mode using a direct AC power conversion device typified by a matrix converter is known. The direct AC power conversion device can be expected to be miniaturized and to enhance efficiency thereof, and accordingly, has attracted attention as a next-generation power conversion device. However, the matrix converter is in a course of being popularized since a main circuit configuration and modulation method thereof are special.

In contrast, there has been proposed a modulation mode using an indirect method of using an indirect conversion device that is a mainstream at present and connecting an AC/DC converter (hereinafter, simply referred to as "converter") and a DC/AC inverter (hereinafter, simply referred to as "inverter") to each other by a DC link (for example, L. Wei, T. A. Lipo, "A Novel Matrix Converter Topology with Simple Commutation", IEEE IAS2001, voL9, pp. 1749-1754(2001)).

The indirect method has already been put into practical use as an air conditioner (for example, Fujita, Sakakibara, Matsuno, "Application and Development of the Three Phase Indirect Matrix Converter for Air Conditioners", The Institute of Electrical Engineers of Japan, The papers of Joint Technical Meeting on Semiconductor Power Converter/Vehicle Technology/Home and Consumer Appliances, SPC-12-174/VT-12-025/HCA-12-059, IEE Japan 2012 (20), pp. 31-36, 2012-12-06) by technological development such as a modulation mode suitable for a consumer microcomputer (for example, Japanese Patent No. 4135026) and a simplification of a main circuit (for example, Japanese Patent No. 4049189). Moreover, application of the indirect method to a single-phase instrument has also been studied by combining an active buffer added with a charging circuit (for example, Ohnuma, Itoh, "Circuit Configuration and Control Strategy of single-to-three Phase Power Converter with Active Buffer and Charging Circuit", The 2010 Annual Meeting of The Institute of Electrical Engineers of Japan, 4-057 (2010) and Japanese Patent Application Laid-Open No. 2011-193678).

Meanwhile, in order to simplify a current sensor, to the indirect conversion device, there is applied a method of detecting a current by DC link by means of a shunt resistor and detecting a phase current on the basis of a switching pattern of an inverter circuit. In order to apply this method, it is necessary to hold the switching pattern for a period longer than both a delay of the current detection and a dead time period.

There has been proposed a technology for extending and maintaining a switching pattern for the purpose of detecting a current, when the switching pattern to be originally adopted is short. In order to reduce a distortion occurring in an output due to such extension, there has also been proposed a technology for correcting a vector pattern, which corresponds to the switching pattern, by another vector pattern (for example, Japanese Patent Application Laid-Open No. H03-230767).

In such a direct conversion device, one cycle of a carrier is divided by an intermediate phase of a command voltage of a current source converter. Then, in each of these divided periods, the same switching pattern is adopted. Hence, it has also been proposed to detect the current in a longer one of the divided periods (for example, Japanese Patent No. 5167869).

Note that Japanese Patent Application Laid-Open No. 2013-93992 is cited as a document that discloses a technology related to the present application.

SUMMARY OF INVENTION

Problems to be Solved by the Invention

It is possible that the divided period may be shortened to a half the cycle of the carrier. Hence, in the method disclosed in Japanese Patent Application Laid-Open No. H03-230767, in the case of extending such a switching pattern for measuring the current, the period while the switching pattern is maintained may be twice the period that should be maintained originally. This brings about an increase in an output distortion in a high speed range, and besides, doubles a period of adopting the vector pattern for correcting for the extension. The latter case causes an increase of the number of switching times of the inverter, and increases a switching loss thereof.

The present invention solves such problems as described above, and it is an object of the present invention to make it possible to perform the current detection without extending the period of maintaining the vector pattern longer than the period while the vector pattern should be maintained originally, thereby avoiding increases of the output distortion and the switching loss.

Means for Solving the Problems

An inverter control device (6) according to the present invention controls a voltage source inverter (4) that converts a DC voltage (Vdc) into three-phase AC voltages (Vu, Vv, Vw).

The voltage source inverter (4) includes three current paths connected in parallel to one another between first and second DC bus lines (LH, LL) to which the DC voltage is applied, in which the potential of the first DC bus line (LH) is higher than that of the second DC bus line (LL). Each of the current paths includes: a connecting point (Pu, Pv, Pw); an upper arm-side switch (Qup, Qvp, Qwp) that is connected between the first DC bus line and the connecting point and flows a current from the first DC bus line to the connecting point at a time of conduction; a lower arm-side switch (Qun, Qvn, Qwn) that is connected between the connecting point and the second DC bus line and flows a current from the connecting point to the second DC bus line at a time of conduction; an upper arm-side diode (Dup, Dvp, Dwp) connected in antiparallel to the upper arm-side switch; and a lower arm-side diode (Dun, Dvn, Dwn) connected in antiparallel to the lower arm-side switch.

Then, a first aspect of the control device includes: a switching signal generation unit (38) that generates a switching signal (Sup, Svp, Swp, Sun, Svn, Swn) that causes any one of the upper arm-side switches and the lower arm-side switch to conduct exclusively of each other in each of the current paths while maintaining conduction/nonconduction of the upper arm-side switch in one cycle (T0) of a triangular wave (C5, C6) on the basis of comparison between the triangular wave (C5, C6) and a plurality of voltage commands included in first and second voltage command groups; and a voltage command generation unit (34) that generates the first and second voltage command groups.

In the one cycle, the triangular wave exhibits a minimum value (Cmin) twice, a first maximal value (Cmax1) once, and a second maximal value (Cmax2) once.

The first voltage command group corresponds to the switching signal in which, in a first section including a point of time (0°) when sums of periods while the upper arm-side switches (Qwp, Qvp) in a pair of the current paths conduct in the one cycle are equal to each other at zero, a period (V0) while the upper arm-side switches in all of the current paths are nonconductive in the one cycle is adjacently sandwiched by a pair of periods (V4) while all of the upper arm-side switches in the pair of the current paths are nonconductive and other of the upper arm-side switch conducts.

The second voltage command group corresponds to the switching signal in which, in a second section exclusive of the first section and including a point of time (60°) when sums of periods while the upper arm-side switches (Qvp, Qup) in a pair of the current paths conduct in the one cycle are equal to each other at non-zero, a period (V7) while the upper arm-side switches in all of the current paths conduct in the one cycle is adjacently sandwiched by a pair of periods (V6) while all of the upper arm-side switches in the pair of the current paths conduct and other of the upper arm-side switch is nonconductive.

Desirably, the inverter control device further includes: a signal wave generation unit (32) that outputs a first signal wave group (Vu1*, Vv1*, Vw1*) and a second signal wave group (Vu2*, Vv2*, Vw2*), each of which includes a first signal wave (Vu1*, Vu2*) indicating a ratio, to the one cycle, of a sum of periods while the upper arm-side switch (Qup) in a first one of the current paths conducts in the one cycle, a second signal wave (Vv1*, Vv2*) indicating a ratio, to the one cycle, of a sum of periods while the upper arm-side switch (Qvp) in a second one of the current paths conducts in the one cycle, and a third signal wave (Vw1*, Vw2*) indicating a ratio, to the one cycle, of a sum of periods while the upper arm-side switch (Qwp) in a third one of the current paths conducts in the one cycle.

The voltage command generation unit generates the first voltage command group and the second voltage command group on the basis of the first signal wave group and the second signal wave group, respectively. The first to third signal waves included in the second signal wave group take values obtained by subtracting, from 1, values in which phases are shifted by 180 degrees from the first to third signal waves included in the first signal wave group, respectively.

Effects of the Invention

In accordance with the inverter control device according to the present invention, it is made possible to perform the current detection without extending the period of maintaining the vector pattern longer than the period while the vector pattern should be maintained originally, whereby the increases of the output distortion and the switching loss are avoided.

Objects, features, aspects and advantages of the present invention will be more obvious by the following detailed description and the accompanying drawings.

BRIEF DESCRIPTION OF DRAWINGS

FIG. 7 is a circuit diagram showing a second configuration of a control device and a direct AC power conversion device to be controlled thereby;

DESCRIPTION OF EMBODIMENTS

First Embodiment

A. First Configuration of Direct AC Power Conversion Device.

Figure 1:
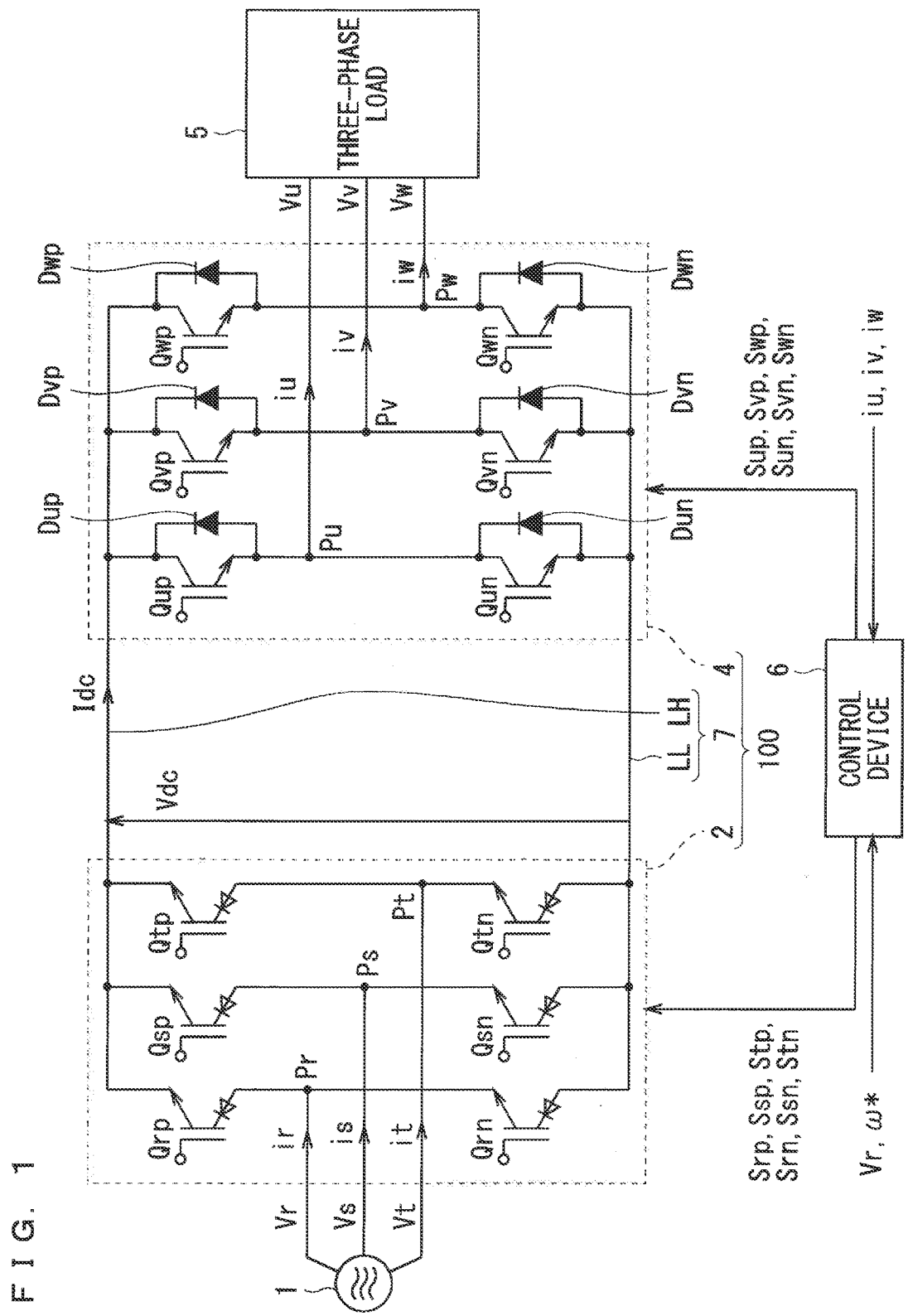
FIG. 1 is a circuit diagram showing a first configuration of a control device and a direct AC power conversion device to be controlled thereby.

FIG. 1 is a circuit diagram showing a control device 6 described in a first embodiment and a configuration of a direct AC power conversion device 100 to be controlled by the control device 6.

The direct AC power conversion device 100 illustrated here is an indirect matrix converter, and includes: a current source converter 2 that performs AC/DC conversion; a voltage source inverter 4 that performs DC/AC conversion; and a DC link 7 that couples the current source converter 2 and the voltage source inverter 4 to each other.

The current source converter 2 and the voltage source inverter 4 are connected to each other by DC bus lines LH and LL which function as the DC link 7. The DC bus line LH is at a higher potential than the DC bus line LL by a link voltage Vdc that is a DC voltage.

Between the DC bus lines LH and LL, a clamp circuit may be provided as proposed in Fujita, Sakakibara, Matsuno, "Application and Development of the Three Phase Indirect Matrix Converter for Air Conditioners", The Institute of Electrical Engineers of Japan, The papers of Joint Technical Meeting on Semiconductor Power Converter/Vehicle Technology/Home and Consumer Appliances, SPC-12-174/VT-12-025/HCA-12-059, IEE Japan 2012 (20), pp. 31-36, 2012-12-06.

The current source converter 2 includes three input ends Pr, Ps and Pt. The input ends Pr, Ps and Pt are connected, for example, to a three-phase AC power supply 1, and receive three-phase AC voltages Vr, Vs and Vt for each phase. The current source converter 2 commutates line currents ir, is and it, which are supplied from the input ends Pr, Ps and Pt, in a cycle divided into a first period and a second period, and outputs the link current Idc between the DC bus lines LH and LL. That is, the current source converter 2 has a function to convert a three-phase AC to a DC. The following description will be made on the assumption that a direction of the line currents ir, is and it from the input ends Pr, Ps and Pt to the voltage source inverter 4 is a forward direction.

The first period is a period while a current flowing through a pair in the input ends Pr, Ps and Pt, the pair receiving application of an AC voltage exhibiting a maximum phase and an AC voltage exhibiting a minimum phase, is supplied as the link current Idc between the DC bus lines LH and LL.

The second period is a period while a current flowing through a pair in the input ends Pr, Ps and Pt, the pair receiving application of an AC voltage exhibiting an intermediate phase and the AC voltage exhibiting the minimum phase, is supplied as the link current Idc between the DC bus lines LH and LL.

The current source converter 2 includes switches Qxp and Qxn (where x represents r, s and t, the same applies hereinafter). The switch Qxp is provided between the input end Px and the DC bus line LH. The switch Qxn is provided between the input end Px and the DC bus line LL.

Both of the switches Qxp and Qxn have a reverse blocking capability, and these are illustrated as RB-IGBTs (Reverse Blocking IGBTs) in FIG. 1. Alternatively, these switches can also be realized by series connections of an insulated gate bipolar transistor (IGBT) and a diode.

Switching signals Sxp and Sxn are inputted to the switches Qxp and Qxn, respectively. The switch Qxp is conductive/nonconductive in response to active/non-active of the switching signal Sxp, and the switch Qxn is conductive/nonconductive in response to active/non-active of the switching signal Sxn.

The voltage source inverter 4 has connecting points Pu, Pv and Pw. The voltage source inverter 4 performs switching for the link voltage Vdc by a switching pattern that is based on pulse width modulation, and outputs three-phase voltages Vu, Vv and Vw from connecting points Pu, Pv and Pw.

The voltage source inverter 4 includes three current paths connected in parallel to one another between the DC bus lines LH and LL to which the link voltage Vdc is applied.

The first current path includes the connecting point Pu, an upper arm-side switch Qup, and a lower arm-side switch Qun. The second current path includes the connecting point Pv, an upper arm-side switch Qvp, and a lower arm-side switch Qvn. The third current path includes the connecting point Pw, an upper arm-side switch Qwp, and a lower arm-side switch Qwn.

At the time of conduction, the switches Qup, Qvp and Qwp flow the currents from the DC bus line LH to the connecting points Pu, Pv and Pw, respectively. At the time of conduction, the switches Qun, Qvn and Qwp flow the currents to the DC bus line LL from the connecting points Pu, Pv and Pw, respectively. The three-phase voltages Vu, Vv and Vw are applied from the connecting points Pu, Pv and Pw to a three-phase load 5, and three-phase currents iu, iv and iw are outputted.

Note that, in the following, a description will be made while taking as an example the case where a three-phase motor is adopted as the three-phase load 5.

Upper arm-side diodes Dup, Dvp and Dwp are connected in antiparallel to the switches Qup, Qvp and Qwp, respectively. Lower arm-side diodes Dun, Dvn and Dwn are connected in antiparallel to the switches Qun, Qvn and Qwn, respectively. Note that, "antiparallel" indicates that two elements are connected in parallel to each other, and that conduction directions of the two elements are opposite to each other.

Switching signals Syp and Syn are inputted to switches Qyp and Qyn, respectively (where y represents u, v and w, the same applies hereinafter). The switch Qyp is conductive/nonconductive in response to active/non-active of the switching signal Syp, and the switch Qyn is conductive/nonconductive in response to active/non-active of the switching signal Syn. However, in the same current path, the switch Qyp and the switch Qyn conduct mutually exclusively.

The control device 6 generates the switching signals Sxp, Sxn, Syp and Syn on the basis of the three-phase currents iu, iv and iw, on the voltage Vr (or the voltage Vs or Vt, or a line-to-line voltage), and on a rotation angular velocity command $\omega^*$ that is a command value for a rotation angular frequency of the three-phase load 5.

Operations of the current source converter 2, which are based on the switching signals Sxp, Sxn, Syp and Syn, are known, for example, by Japanese Patent No. 4135026, Japanese Patent No. 4049189, Japanese Patent No. 5167869, Fujita, Sakakibara, Matsuno, "Application and Development of the Three Phase Indirect Matrix Converter for Air Conditioners", The Institute of Electrical Engineers of Japan, The papers of Joint Technical Meeting on Semiconductor Power Converter/Vehicle Technology/Home and Consumer Appliances, SPC-12-174/VT-12-025/HCA-12-059, IEE Japan 2012 (20), pp. 31-36, 2012-12-06 and the like, and accordingly, a detailed description thereof will be omitted. However, a brief description will be made of portions serving as the premise of the description of the respective embodiments.

Now, it is assumed that the voltage Vt is the minimum phase, and the voltages Vr and Vs become the maximum phase and the intermediate phase, respectively. Due to symmetry of a phase voltage waveform, such assumption does not lose generality by exchanging a phase sequence and by exchanging phases of the switches Qxp and Qxn.

Then, when such an assumption is made, both of line-to-line voltages (Vr-Vt) and (Vs-Vt) are positive, and these are selectively outputted as the link voltage Vdc. Such a selective output is realized in such a manner that there are selected: a first state in which the switches Qrp and Qtn are on and the switches Qrn and Qtp are off; and a second state in which the switches Qtn and Qsp are on and the switches Qtp and Qsn are off. A period while the first state is maintained is the first period mentioned above, and a period while the second state is maintained is the second period mentioned above. Then, switching between the first state and the second state is understood as commutation of the current source converter 2 together with commutation which accompanies the exchange of the maximum phase, the intermediate phase and the minimum phase at the voltages Vr, Vs and Vt.

The first state and the second state are switched (that is, the current source converter 2 commutates) at a frequency higher than a frequency of the three-phase AC voltages Vr, Vs and Vt (hereinafter, this frequency is also referred to as "power supply frequency"), whereby there is obtained the link voltage Vdc that is a DC voltage though a pulsation that fluctuates at a frequency six times a power supply frequency is included.

Timing of such commutation can be determined by a sawtooth wave and conduction ratios drt and dst (=1-drt). When a cycle of the sawtooth wave is T0, a maximum value thereof is 1, and a minimum value thereof is 0, then a length of the first period is determined by a period drt·T0, and a length of the second period is determined by a period dst·T0. Hence, the current source converter 2 commutates when the sawtooth wave becomes equal to one of the conduction ratios, for example, when the sawtooth wave becomes equal to the conduction ratio dst in the case that the sawtooth wave rises gradually and falls steeply. A desirable way of selecting the conduction ratios drt and dst in this case is known, for example, by Japanese Patent No. 4135026, and accordingly, a description thereof is omitted; however, Japanese Patent No. 4135026 illustrates the case where the sawtooth wave falls gradually and rises steeply; and accordingly, illustrates commutation at a point of time when the sawtooth wave becomes equal to the conduction ratio drt. In this embodiment, a description will be made while taking as an example the case where the sawtooth wave rises gradually and falls steeply; however, it is obvious that the description is also applicable to the case where the sawtooth wave falls gradually and rises steeply if the conduction ratios are considered to be swapped.

Moreover, it is obvious that the timing of the commutation can be concluded to the above description by performing appropriate linear processing for the conduction ratios drt and dst even if the maximum value and minimum value of the sawtooth wave take values other than the values 1 and 0.

Figure 2:
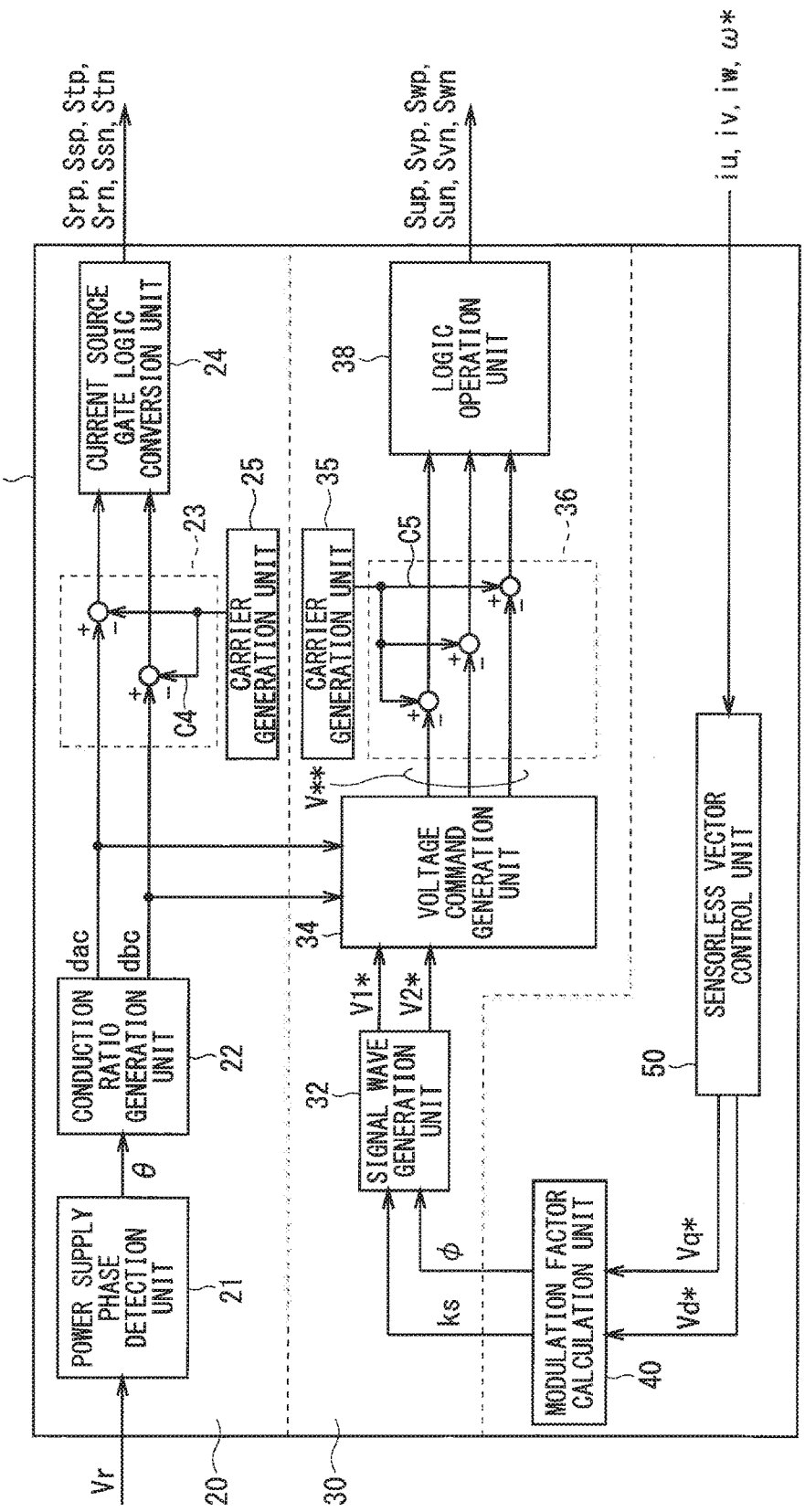
FIG. 2 is a block diagram illustrating the configuration of the control device.

FIG. 2 is a block diagram illustrating a configuration of the control device 6. The control device 6 includes a converter control unit 20, an inverter control unit 30, a modulation factor calculation unit 40, and a sensorless vector control unit 50.

The converter control unit 20 includes a power supply phase detection unit 21, a conduction ratio generation unit 22, a comparator 23, a current source gate logic conversion unit 24, and a carrier generation unit 25.

For example, the power supply phase detection unit 21 detects the voltage Vr to detect a phase angle θ of the three-phase AC voltage applied to the input ends Pr, Ps and Pt, and outputs the phase angle θ to the conduction ratio generation unit 22.

The conduction ratio generation unit 22 outputs conduction ratios dac and dbc based on the received phase angle θ. The conduction ratios dac and dbc show the above-mentioned conduction ratios drt and dst in a generalized manner, and when the voltages Vr, Vs and Vt are the maximum phase, the intermediate phase, and the minimum phase, respectively, then such symbols a, b and c correspond to the symbols r, s and t, respectively.

The carrier generation unit 25 generates a carrier C4 that is the above-mentioned sawtooth wave. The comparator 23 outputs results of comparing the carrier C4 and the conduction ratios dac and dbc with each other, and on the basis of this, the current source gate logic conversion unit 24 generates switching signals Srp, Ssp, Stp, Srn, Ssn and Stn.

The inverter control unit 30 includes a signal wave generation unit 32, a voltage command generation unit 34, a carrier generation unit 35, a comparator 36, and a logic operation unit 38.

The signal wave generation unit 32 generates signal wave groups V1* and V2* of the voltage source inverter 4 on the basis of a modulation factor ks and a phase angle φ, which are received from the modulation factor calculation unit 40. The modulation factor ks is a ratio of a peak value of the link voltage Vdc to a peak value of the voltages Vr, Vs and Vt. The phase angle φ is, for example, a phase of the voltage Vu, and is an electrical angle for the three-phase load 5. The signal wave groups V1* and V2* will be described in "B. Explanation of signal wave group".

The voltage command generation unit 34 generates a voltage command group V** from either one of the signal wave groups V1* and V2* and the conduction ratios dac and dbc. The voltage command group V** includes six voltage commands (two of which may become equal to each other), and arithmetic operations for obtaining such voltage commands differ from one another depending on the embodiments, and accordingly, will be described in the respective embodiments.

The carrier generation unit 35 generates a carrier C5. A shape of the carrier C5 will be described later. However, a cycle of the carrier C5 is equal to the cycle T0 of the carrier C4.

The voltage commands included in the voltage command group V** are compared with the carrier C5 in the comparator 36, and results thereof are calculated by the logic operation unit 38. By this arithmetic operation, the logic operation unit 38 generates the switching signals Syp and Syn. That is, the logic operation unit 38 functions as a switching signal generation unit.

The modulation factor calculation unit 40 receives such a d-axis voltage command Vd* and such a q-axis voltage command Vq* from the sensorless vector control unit 50, calculates the modulation factor ks and the phase angle φ, and sends these to the signal wave generation unit 32.

On the basis of the three-phase currents iu, iv and iw, the sensorless vector control unit 50 calculates a rotational angular velocity ω of a motor, and on the basis of these and a rotational angular velocity command ω* inputted from the outside, the sensorless vector control unit 50 calculates the d-axis voltage command Vd* and the q-axis voltage command Vq*.

Functions of the logic operation unit 38, the modulation factor calculation unit 40 and the sensorless vector control unit 50 and configurations thereof are also known technologies, and accordingly, details thereof are omitted here.

The control device 6 is composed by including a microcomputer and a storage device. The microcomputer executes respective processing steps (in other words, procedures) written in a program. The storage device can be composed of one or plural storage devices, for example, such as a ROM (Read Only Memory), a RAM (Random Access Memory), a rewritable nonvolatile memory (an EPROM (Erasable Programmable ROM) and the like). The storage device stores various types of information, data and the like, and moreover, stores a program executed by the microcomputer, and provides a work area for executing the program. Note that it can also be understood that the microcomputer functions as a variety of means corresponding to the respective processing steps written in the program, or alternatively, it can also be understood that the microcomputer realizes a variety of functions corresponding to the respective processing steps. Moreover, the control device 6 is not limited to this, and some or all of a variety of such procedures executed by the control device 6 or the variety of means or the variety of functions, which are realized thereby, may be realized by hardware.

B. Explanation of Signal Wave Group.

Figure 3:
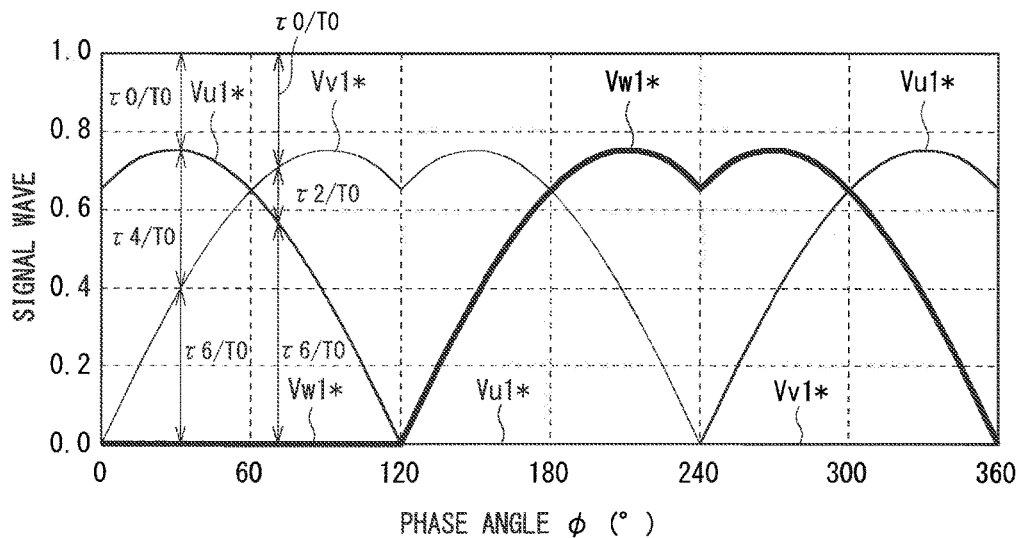
FIGS. 3 and 4 are graphs showing signal wave groups.
Figure 4:
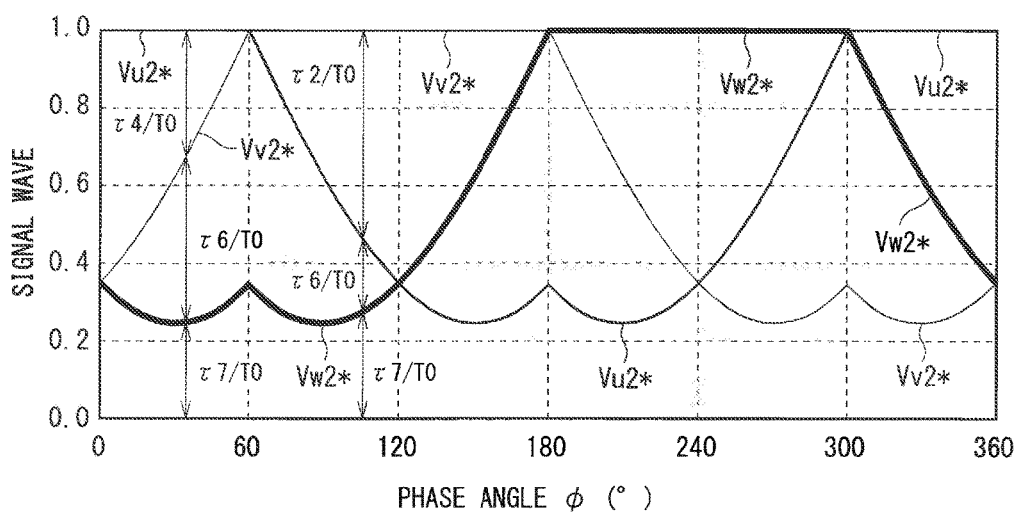

FIG. 3 and FIG. 4 are graphs showing the signal wave groups V1* and V2*, which are commonly adopted in all the embodiments. In each of FIG. 3 and FIG. 4, the phase angle φ is adopted on an axis of abscissas.

The signal wave group V1* includes signal waves Vu1*, Vv1* and Vw1*, and the signal wave group V2* includes signal waves Vu2*, Vv2* and Vw2*.

Each of the signal waves Vu1* and Vu2* indicates a ratio, to the cycle T0, of a sum of periods while the switch Qup conducts in the cycle T0 of the carrier C4. Each of the signal waves Vv1* and Vv2* indicates a ratio, to the cycle T0, of a sum of periods while the switch Qvp conducts in the cycle T0 of the carrier C4. Each of the signal waves Vw1* and Vw2* indicates a ratio, to the cycle T0, of a sum of periods while the switch Qwp conducts in the cycle T0 of the carrier C4.

In other words, when the voltage command included in the voltage command group V** generated on the basis of the signal wave group V1* is compared with the carrier C5, a sum of lengths at which the switch Qyp conducts in one cycle of the carrier C4 is Vy1*·T0. When the voltage command included in the voltage command group V** generated on the basis of the signal wave group V2* is compared with the carrier C5, a sum of lengths at which the switch Qyp conducts in one cycle of the carrier C4 is Vy2*·T0.

A value obtained by subtracting the signal wave Vv1* from the signal wave Vu1* is equal to a value obtained by subtracting the signal wave Vv2* from the signal wave Vu2*, and a value obtained by subtracting the signal wave Vw1* from the signal wave Vv1* is equal to a value obtained by subtracting the signal wave Vw2* from the signal wave Vv2*. Hence, a sum of the lengths of such switching patterns adopted by the voltage source inverter 4 in one cycle of the carrier C4, excluding a switching pattern in which the link current Idc becomes zero, does not affect whether the voltage command included in the voltage command group V** is generated on the basis of the signal wave group V1* or is generated on the basis of the signal wave group V2*.

For the explanation which will be made later, a unit voltage vector Vg corresponding to such a switching pattern is introduced. However, in this notation, a value g is a value obtained by assigning values 4, 2 and 1 to a U-phase, a V-phase and a W-phase, respectively, and adding the assigned values to one another when upper arms corresponding thereto conduct, and the value g takes an integer of 0 to 7.

For example, a unit voltage vector V4 represents a switching pattern in which the switches Qup, Qvn and Qwn conduct and the switches Qun, Qvp and Qwp are nonconductive. Moreover, a unit voltage vector V6 represents a switching pattern in which the switches Qup, Qvp and Qwn conduct and the switches Qun, Qvn and Qwp are nonconductive. Moreover, a unit voltage vector V0 represents a switching pattern in which the switches Qun, Qvn and Qwn conduct and the switches Qup, Qvp and Qwp are nonconductive. Furthermore, a unit voltage vector V7 represents a switching pattern in which the switches Qup, Qvp and Qwp conduct and the switches Qun, Qvn and Qwn are nonconductive.

The unit voltage vectors V0 and V7 each represent a switching pattern in which the link current Idc becomes zero, and these are referred to as zero voltage vectors.

Now, a case where the direct AC power conversion device 100 is operated by a so-called two-phase modulation mode will be handled below. In the two-phase modulation mode, in one cycle of the carrier C5 (a length of this cycle is equal to the cycle T0 of the carrier C4), conduction or nonconduction of the switch Qyp in any one of the current paths is maintained.

With regard to the signal wave group V1*, for example, the following Expressions (1) to (3) are set at $0 \leq \phi \leq \pi/3$ (for example, refer to Japanese Patent No. 4135026). In a similar way, the following Expressions (4) to (6) are set at $\pi/3 \leq \phi \leq 2\pi/3$. However, periods τ0, τ2, τ4 and τ6 indicate sums of periods which the unit voltage vectors V0, V4 and V6 take in one cycle of the carrier C4, respectively.

$$\tau 0/T0 = 1 - ks \cdot \sin(\phi + \pi/3) \quad (1)$$

$$\tau 4/T0 = ks \cdot \sin(\pi/3 - \phi) \quad (2)$$

$$\tau 6/T0 = ks \cdot \sin(\phi) \quad (3)$$

$$\tau 0/T0 = 1 - ks \cdot \sin(\phi) \quad (4)$$

$$\tau 2/T0 = ks \cdot \sin(\phi - \pi/3) \quad (5)$$

$$\tau 6/T0 = 1 - ks \cdot \sin(\phi + \pi/3) \quad (6)$$

Hence, with reference to FIG. 3, the signal wave group V1* is set by the following Expressions (7) to (9) at $0 \leq \phi \leq 2\pi/3$. In this case, with regard to the upper arm-side switch Qwp in the third current path, the nonconduction thereof is maintained in one cycle of the carrier C5.

$$Vu1^* = ks \cdot \sin(\phi + \pi/3) \quad (7)$$

$$Vv1^* = ks \cdot \sin(\phi) \quad (8)$$

$$Vw1^* = 0 \quad (9)$$

In a similar way, the signal wave group V1* is set by the following Expressions (10) to (12) at $2\pi/3 \leq \phi \leq 4\pi/3$. In this case, with regard to the upper arm-side switch Qup in the first current path, the nonconduction thereof is maintained in one cycle of the carrier C5.

$$Vu1^* = 0 \quad (10)$$

$$Vv1^* = ks \cdot \sin(\phi - \pi/3) \quad (11)$$

$$Vw1^* = -ks \cdot \sin(\phi + \pi/3) \quad (12)$$

In a similar way, the signal wave group V1* is set by the following Expressions (13) to (15) at $4\pi/3 \leq \phi \leq 2\pi$. In this case, with regard to the upper arm-side switch Qvp in the second current path, the nonconduction thereof is maintained in one cycle of the carrier C5.

$$Vu1^* = -ks \cdot \sin(\phi - \pi/3) \quad (13)$$

$$Vv1^* = 0 \quad (14)$$

$$Vw1^* = -ks \cdot \sin(\phi) \quad (15)$$

When the signal wave group V1* is adopted as mentioned above, then at $-\pi/3 \leq \phi \leq \pi/3$, the signal wave group V2* is set by the following Expressions (16) to (18) with reference to FIG. 4. However, in FIG. 4, a period τ7 indicates a sum of periods which the zero voltage vector V7 takes in one cycle of the carrier C4. In this case, with regard to the upper arm-side switch Qup in the first current path, the conduction thereof is maintained in one cycle of the carrier C5.

$$Vu2^* = 1 \quad (16)$$

$$Vv2^* = 1 - ks \cdot \sin(\phi - \pi/3) \quad (17)$$

$$Vw2^* = 1 - ks \cdot \sin(\phi + \pi/3) \quad (18)$$

The following expressions are established at $0 \leq \phi \leq \pi/3$, and it is understood that the signal wave group V2* are set so as to cause the periods τ4 and τ6 to satisfy Expressions (2) and (3), in a similar way to the signal wave group V1*.

$$Vu2^* - Vv2^* = ks \cdot \sin(\phi - \pi/3) = \tau 4/T0 \quad (19)$$

$$Vv2^* - Vw2^* = ks \cdot \sin(\phi - \pi/3) + ks \cdot \sin(\phi + \pi/3) = 2 \cdot ks \cdot \sin(\phi) \cdot \cos(\pi/3) = ks \cdot \sin(\phi) = \tau 6/T0 \quad (20)$$

In a similar way, the signal wave group V2* is set by the following Expressions (21) to (23) at $\pi/3 \leq \phi \leq \pi$. In this case, with regard to the upper arm-side switch Qvp in the second current path, the conduction thereof is maintained in one cycle of the carrier C5.

$$Vu2^* = 1 - ks \cdot \sin(\phi - \pi/3) \quad (21)$$

$$Vv2^* = 1 \quad (22)$$

$$Vw2^* = 1 - ks \cdot \sin(\phi) \quad (23)$$

In a similar way, the signal wave group V2* is individually set by the following Expressions (24) to (26) at $\pi \leq \phi \leq 5\pi/3$. In this case, with regard to the upper arm-side switch Qwp in the third current path, the conduction thereof is maintained in one cycle of the carrier C5.

$$Vu2^* = 1 + ks \cdot \sin(\phi + \pi/3) \tag{24}$$

$$Vv2^* = 1 + ks \cdot \sin(\phi) \tag{25}$$

$$Vw2^* = 1 \tag{26}$$

From comparison between FIG. 3 and FIG. 4 and comparison between Expressions (7) to (15) and Expressions (16) to (18) and (21) to (26), it is understood that the signal waves Vu2*, Vv2* and Vw2*, which are included in the signal wave group V2*, take values obtained by subtracting, from 1, values in which phases are shifted by 180 degrees from the signal waves Vu1*, Vv1* and Vw1*, which are included in the signal wave group V1*.

C. Explanation of Voltage Command Group.

Figure 5:
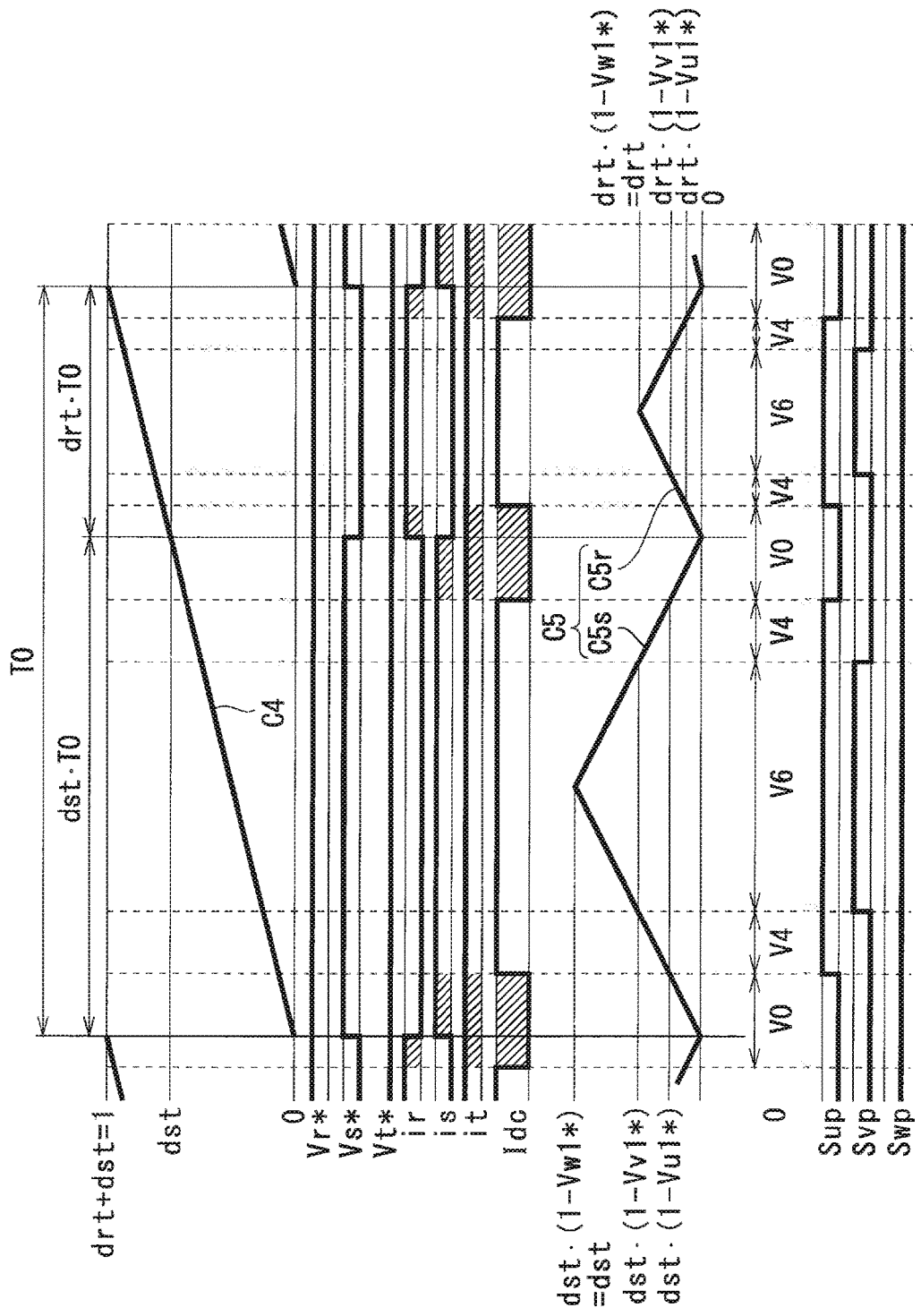
FIGS. 5 and 6 are graphs showing a first embodiment.
Figure 6:
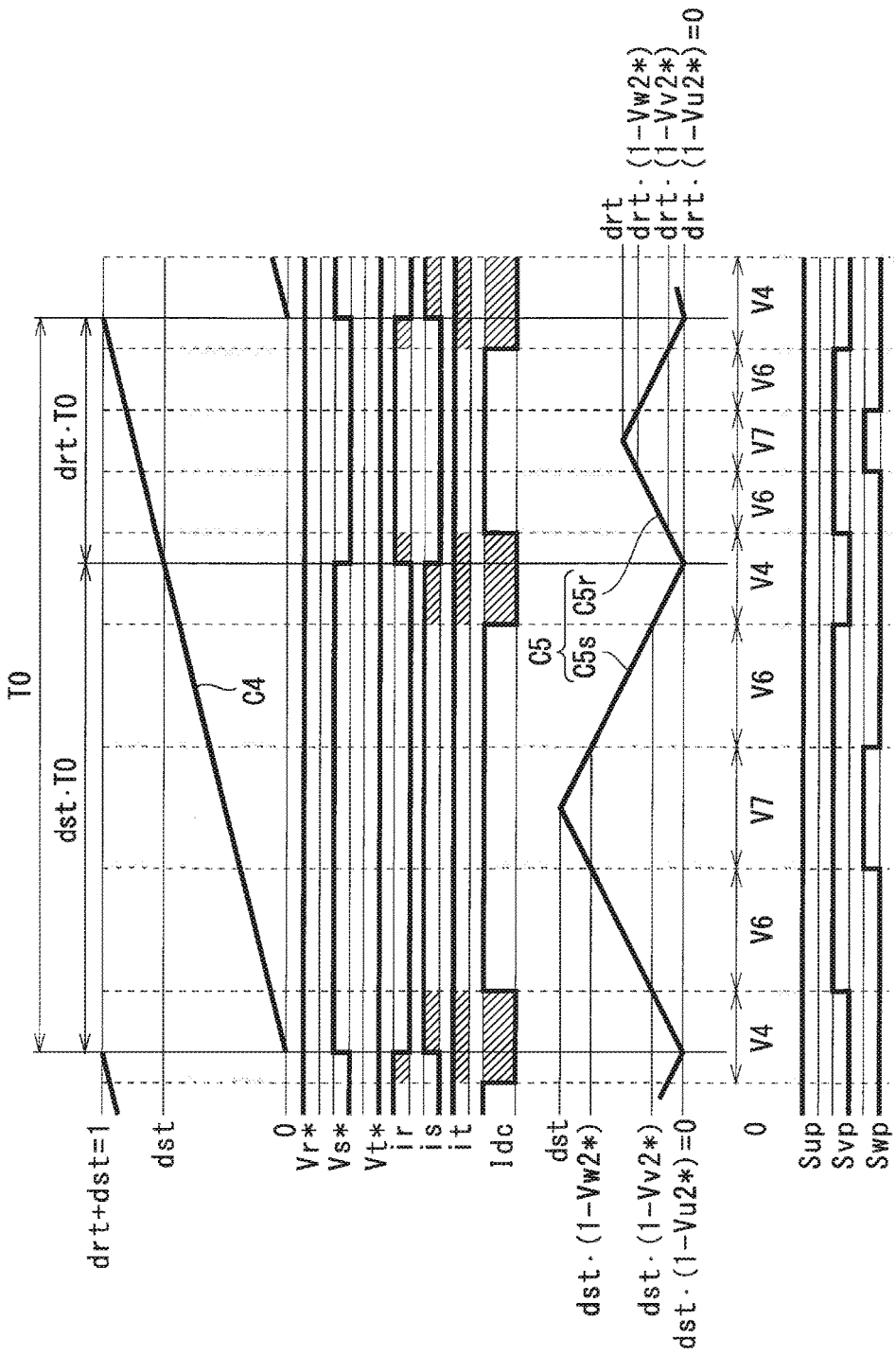

Each of FIG. 5 and FIG. 6 is a graph showing a state in which the carrier C5 and the voltage command group V** are compared with each other at $0 \leq \phi \leq \pi/3$, and the active/non-active of the switching signals Sup, Svp and Swp is determined. However, the carrier C4 and the conduction ratio dst, which determine the commutation of the current source converter 2, are also described. Moreover, signal waves Vr*, Vs* and Vt*, line currents ir, is and it and link current Idc of the current source converter 2 are also described.

Voltage-source trapezoidal waves are set for the signal waves Vr*, Vs* and Vt*, whereby the commutation of the current source converter 2 is performed on the basis of two voltage vectors. Hence, the current source converter 2 commutates at a point of time when the carrier C4 becomes equal to one of the conduction ratios, for example, the conduction ratio dst. As shown in Japanese Patent No. 4135026, such commutation of the current source converter 2, which is as described above, is realized by the switching pattern of the current source converter 2, which is obtained by performing current-source gate conversion.

Note that regions where the link current Idc and the line currents ir, is and it do not flow by the operation on the voltage source inverter 4 are hatched in FIG. 5 and FIG. 6.

Moreover, the carrier C5 is a triangular wave, and in one cycle, exhibits a minimum value Cmin twice, a first maximal value Cmax1 once, and a second maximal value Cmax2 once.

The carrier C5 is divided into a portion C5r continuous in the first period of the length drt·T0 and a portion C5s continuous in the second period of the length dst·T0.

Each of the portions C5r and C5s is a symmetric triangular wave, and takes a minimum value Cmin. The portion C5r takes a first maximal value Cmax1, and the portion C5s takes a second maximal value Cmax2. (Cmax1−Cmin):(Cmax2−Cmin)=drt:dst is established. Here, a variation width ΔD is introduced, whereby Cmax1−Cmin=ΔD·drt and Cmax2−Cmin=ΔD·dst can be established. That is, ΔD=Cmax1+Cmax2−2·Cmin is established.

However, each of FIG. 5 and FIG. 6 illustrates a case where ΔD=1 and Cmin=0 in each of these: the first maximal value Cmax1 appears as the conduction ratio drt; and the second maximal value Cmax2 appears as the conduction ratio dst.

The carrier C5 takes the minimum value Cmin at a first point of time of shifting from the second period to the first period and at a second point of time of shifting from the first period to the second period, while the portions C5r and C5s are continuous with each other at the first point of time and the second point of time. Specifically, when the carrier C5 increases after taking the minimum value Cmin at the second point of time to reach the second maximal value Cmax2 at the portion C5s, then the carrier C5 decreases to take the minimum value Cmin thereof at the first point of time. Thereafter, the carrier C5 continues to increase until taking the first maximal value Cmax1 in the portion C5r. When the carrier C5 decreases after taking the first maximal value Cmax1 in the portion C5r and reaches the second point of time, the carrier C5 takes the minimum value Cmin.

First, the voltage command group V** adopted in the case shown in FIG. 5 is generated on the basis of the signal wave group V1*. Specifically, the voltage command group V** includes the following six voltage commands:

First voltage command: $Cmax1 - \Delta D \cdot drt \cdot Vu1^*$
$= (Cmax1 - Cmin) + Cmin - \Delta D \cdot drt \cdot Vu1^*$
$= Cmin + \Delta D \cdot drt(1 - Vu1^*)$ Second voltage command: $Cmax1 - \Delta D \cdot drt \cdot Vv1^*$,
$= (Cmax1 - Cmin) + Cmin - \Delta D \cdot drt \cdot Vv1^*$
$= Cmin + \Delta D \cdot drt(1 - Vv1^*)$ Third voltage command: $Cmax1 - \Delta D \cdot drt \cdot Vw1^*$,
$= (Cmax1 - Cmin) + Cmin - \Delta D \cdot drt \cdot Vw1^*$
$= Cmin + \Delta D \cdot drt(1 - Vw1^*)$, Fourth voltage command: $Cmin + \Delta D \cdot dst \cdot (1 - Vu1^*)$, Fifth voltage command: $Cmin + \Delta D \cdot dst \cdot (1 - Vv1^*)$, Sixth voltage command: $Cmin + \Delta D \cdot dst \cdot (1 - Vw1^*)$.

The conduction ratios drt and dst, which are adopted as mentioned above, are zero or positive, and the variation width ΔD is positive, and accordingly, both of ΔD·drt and ΔD·dst are non-negative.

At $0 \leq \phi \leq \pi/3$, Vw1*=0 is established as shown in Expression (9), and accordingly, the third voltage command Cmax1−ΔD·drt·Vw1* is equal to the first maximal value Cmax1, and the sixth voltage command Cmin+ΔD·dst·(1−Vw1) is equal to the second maximal value Cmax2 (in FIG. 5, the case where ΔD=1 and Cmin=0 is illustrated, and the third voltage command and the sixth voltage command take the conduction ratios drt and dst, respectively).

Then, when the portion C5r is larger than the first voltage command Cmax1−ΔD·drt·Vu1*, and when the portion C5s is larger than the fourth voltage command Cmin+ΔD·dst·(1−Vu1*), the switching signal Sup is active, and the switch Qup is caused to conduct. When the portion C5r is larger than the second voltage command Cmax1−ΔD·drt·Vv1*, and when the portion C5s is larger than the fifth voltage command Cmin+ΔD·dst·(1−Vv1*), the switching signal Svp is active, and the switch Qvp is caused to conduct. When the portion C5r is larger than the third voltage command Cmax1−ΔD·drt·Vw1*, and when the portion C5s is larger than the sixth voltage command Cmin+ΔD·dst·(1−Vw1*), the switching signal Swp is active, and the switch Qwp is caused to conduct.

A period while the switching signal Sy is active is calculated by Expression (27).

$$[\{Cmax1 - (Cmax1 - \Delta D \cdot drt \cdot Vy1^*)\} + \{Cmax2 - (Cmin + \Delta D \cdot dst \cdot (1 - Vy1^*))\}] \times T0 / \Delta D = Vy1^* \cdot T0 \tag{27}$$

Hence, the voltage command group V is determined as mentioned above, and the switching signal Syp is set as mentioned above by the comparison between the voltage command group V and the carrier C5, whereby a sum of conduction periods of the switch Qyp, which are set by the signal wave group V1*, is obtained.

Note that, at $0 \leq \phi \leq \pi/3$, Vw1*=0 is established as shown in Expression (9), and accordingly, the third voltage command is drt, the sixth voltage command is dst, and the non-active of the switching signal Swp is maintained.

For the sake of convenience, the two-phase modulation mode thus obtained will be referred to as a first two-phase modulation mode.

In the first two-phase modulation mode, timing at which the current source converter 2 commutates (that is, the first point of time and the second point of time when the carrier C5 takes the minimum value Cmin) is included in a period while the zero voltage vector V0 is adopted for the operations of the voltage source inverter 4. Hence, so-called zero current switching is realized, in which the current source converter 2 commutates when the link current Idc is zero. This is desirable from a viewpoint of avoiding a switching loss during this commutation.

In one cycle of the carrier C5, a period while the unit voltage vector V6 is adopted is obtained as continuous periods individually in the first period and the second period. Hence, it is easy to obtain a period necessary to measure the link current Idc in the period while the unit voltage vector V6 is adopted.

However, referring to FIG. 3 and Expression (2), the length τ4/T0 is shortened when the phase angle φ approaches 60° at less than 60°. In addition, referring to FIG. 5, a period while the unit voltage vector V4 is adopted is divided into two in each of the first period and the second period. Hence, for the period while the unit voltage vector V4 is adopted, it is difficult to obtain the length necessary to measure the link current Idc.

In a similar way, if the phase angle φ approaches 60° while being left larger than 60°, the length τ2/T0 is shortened, and for the period while the unit voltage vector V2 is adopted, it becomes difficult to obtain the length necessary to measure the link current Idc.

Accordingly, in this embodiment, when the phase angle φ is less than 60° and close to 60°, those generated on the basis of the signal wave group V2* are adopted as the voltage command group V (refer to FIG. 6). Specifically, the voltage command group V includes the following six voltage commands:
First voltage command; Cmin+ΔD·drt·(1−Vu2*),
Second voltage command; Cmin+ΔD·drt·(1−Vv2*),
Third voltage command; Cmin+ΔD·drt·(1−Vw2*),
Fourth voltage command; Cmin+ΔD·dst·(1−Vu2*),
Fifth voltage command; Cmin+ΔD·dst·(1−Vv2*),
Sixth voltage command; Cmin+ΔD·dst·(1−Vw2*).

Note that, since Vu2*=1 is established at $0 \leq \phi \leq \pi/3$ as shown in Expression (16), the first voltage command Cmin and the fourth voltage command Cmin are obtained (these values are equal to 0 since FIG. 6 illustrates a case of ΔD=1 and Cmin=0).

Then, when the portion C5r is larger than the first voltage command Cmin+ΔD·drt·(1−Vu2*), and when the portion C5s is larger than the fourth voltage command Cmin+ΔD·dst·(1−Vu2*), the switching signal Sup is active, and the switch Qup is caused to conduct. When the portion C5r is larger than the second voltage command Cmin+ΔD·drt·(1−Vv2*), and when the portion C5s is larger than the fifth voltage command Cmin+ΔD·dst·(1−Vv2*), the switching signal Svp is active, and the switch Qvp is caused to conduct. When the portion C5r is larger than the third voltage command Cmin+ΔD·drt·(1−Vw2*), and when the portion C5s is larger than the sixth voltage command Cmin+ΔD·dst·(1−Vw2*), the switching signal Swp is active, and the switch Qwp is caused to conduct.

Such a period while the switching signal Sy is active is calculated by Expression (28).

$$[\{Cmax1-(Cmin+\Delta D \cdot drt \cdot (1-Vy2^*))\}+\{Cmax2-(Cmin+\Delta D \cdot dst \cdot (1-Vy2^*))\}] \times T0/\Delta D=Vy2^* \cdot T0 \quad (28).$$

Hence, the voltage command group V is determined as mentioned above, and the switching signal Syp is set as mentioned above by the comparison between the voltage command group V and the carrier C5, whereby a sum of conduction periods of the switch Qyp, which are set by the signal wave group V2*, is obtained.

Note that, at $0 \leq \phi \leq \pi/3$, both of the first voltage command Cmin+ΔD·drt·(1−Vu2*) and the fourth voltage command Cmin+ΔD·dst·(1−Vu2*) are equal to the minimum value Cmin as mentioned above, and accordingly, the activation of the switching signal Sup is maintained.

For the sake of convenience, the two-phase modulation mode thus obtained will be referred to as a second two-phase modulation mode.

In the first two-phase modulation mode and the second two-phase modulation mode, the sum of the conduction periods of the switches, which are respectively set by the signal wave group V1* and the signal wave group V2*, is obtained. Then, as illustrated at $0 \leq \phi \leq \pi/3$ in "B. Explanation of signal wave group", except when the zero voltage vectors V0 and V7 are adopted, the sum of the lengths of the switching patterns adopted by the voltage source inverter 4 in one cycle of the carrier C4 is equally set in the signal wave group V1* and in the signal wave group V2*. Hence, except when the link current Idc becomes 0, the sum of the periods while the unit voltage vectors are adopted does not differ between the first two-phase modulation mode and the second two-phase modulation mode.

When the link current Idc becomes zero, there are performed compensation of an offset of a circuit that detects the link current Idc by a detection signal in such periods while the zero voltage vectors V0 and V7 are adopted, and the like. However, a time constant of drift in this detection is extremely large relative to such a carrier cycle. Hence, it is sufficient if the detection of the link current Idc and the compensation of the offset are appropriately performed at timing at which the period while the zero voltage vector is detectable can be ensured.

Then, in the second two-phase modulation mode, the periods while the unit voltage vector V4 is adopted are obtained as continuous periods individually at the first point of time and the second point of time. Hence, it is easy to obtain a period necessary to measure the link current Idc in the period while the unit voltage vector V4 is adopted.

On the other hand, a period while the unit voltage vector V6 is adopted is divided into two in each of the first period and the second period. Hence, for the period while the unit voltage vector V4 is adopted, it is difficult to obtain the length necessary to measure the link current Idc.

Hence, it is desirable to adopt the second two-phase modulation mode in the vicinity of 60° where the period T4 is shortened, and to adopt the first two-phase modulation mode in the vicinity of 0° where the period τ6 is shortened.

This utilizes the fact that, in each of the two-phase modulation modes, only two types, which are the unit voltage vectors V4 and V6, are adopted except for the zero voltage vectors V0 and V7. That is, in the first two-phase modulation mode, the period while the zero voltage vector V0 is adopted, the period appearing twice in one cycle of the carrier C5, is adjacently sandwiched by the periods while the unit voltage vector V4 is adopted, whereby the period while the unit voltage vector V6 is adopted will be generated in periods as the rest thereof. In this way, the period while the unit voltage vector V6 is adopted is divided into no more than two in one cycle of the carrier C5.

On the other hand, in the second two-phase modulation mode, the period while the zero voltage vector V7 is adopted, the period appearing twice in one cycle of the carrier C5, is adjacently sandwiched by the periods while the unit voltage vector V6 is adopted, whereby the period while the unit voltage vector V4 is adopted will be generated in periods as the rest thereof. In this way, the period while the unit voltage vector V4 is adopted is divided into no more than two in one cycle of the carrier C5.

These are described as follows in a generalized manner:
(i) The voltage command group V** adopted in the first two-phase modulation mode is adopted in the first section including the point of time (in the above-mentioned illustration, the phase angle $\phi=0°$ at which both of the signal waves Vv1* and Vw1* become zero) when the sums of the periods while the upper arm-side switches in the pair of current paths (which are the switches Qwp and Qvp in the above-mentioned illustration, that is, in the case of $0 \leq \phi \leq \pi/3$) conduct in one cycle of the carrier C5 are equal to each other at zero; and
(ii) the period (period while the zero voltage vector V0 is adopted) while the upper arm-side switches Qup, Qwp and Qvp in all of the current paths are nonconductive in this one cycle is adjacently sandwiched by the pair of periods (the periods while the unit voltage vector V4 is adopted in the above-mentioned illustration) while all of the upper arm-side switches in the pair of current paths (which are the switches Qwp and Qvp in the above-mentioned illustration) are nonconductive and the other upper arm-side switch (Qup in the above-mentioned illustration) conducts.
(iii) The voltage command group V** adopted in the second two-phase modulation mode is adopted in the second section including the point of time (in the above-mentioned illustration, the phase angle $\phi=60°$ at which both of the signal waves Vu2* and Vv2* become equal to each other and non-zero) when the sums of the periods while the upper arm-side switches in the pair of current paths (which are the switches Qup and Qvp in the above-mentioned illustration) conduct in one cycle of the carrier C5 are non-zero and equal to each other; and
(iv) the period (period while the zero voltage vector V7 is adopted) while the upper arm-side switches Qup, Qwp and Qvp in all of the current paths conduct in this one cycle is adjacently sandwiched by the pair of periods (the periods while the unit voltage vector V6 is adopted in the above-mentioned illustration) while all of the upper arm-side switches in the pair of current paths (which are the switches Qup and Qvp in the above-mentioned illustration) conduct and the other upper arm-side switch (Qwp in the above-mentioned illustration) is nonconductive.
(v) Then, the switching signals Syp and Syn are determined so as to correspond to the voltage command groups described in the above (i) to (iv). That is, in the first section, the switching signals Syp and Syn are generated on the basis of the comparison between the voltage command group V adopted in the first two-phase modulation mode and the carrier C5, which is the triangular wave, and the switching pattern (ii) is obtained. In the second section, the switching signals Syp and Syn are generated on the basis of the comparison between the voltage command group V adopted in the second two-phase modulation mode and the carrier C5, which is the triangular wave, and the switching pattern (iv) is obtained.

Note that the length of the first section and the length of the second section can be appropriately determined in response to the length required for the current detection. However, as a matter of course, the first section and the second section must be exclusive of each other.

In this way, the first two-phase modulation mode and the second two-phase modulation mode are selectively used in response to the phase angle (1), whereby the current detection can be performed without extending the period of maintaining the vector pattern longer than the period while the vector pattern should be maintained originally. Hence, no compensation is required for the voltage vectors, and the output distortion and the switching loss are avoided increasing.

Note that it is obvious that, due to the symmetry of the waveform, other ranges which the phase angle $\phi$ can take at other than $0 \leq \phi \leq \pi/3$ can also be explained by the above-described (i) to (v).

Second Embodiment

D. Second Configuration of Direct AC Power Conversion Device.

FIG. 7 is a circuit diagram showing a control device 8 described in a second embodiment and a configuration of a direct AC power conversion device 200 to be controlled by the control device 8.

The direct AC power conversion device 200 illustrated here includes: a rectifier circuit 12 that performs single-phase full-wave rectification; a power buffer circuit 9; a voltage source inverter 4 that performs DC/AC conversion; and a DC link 7 that links the rectifier circuit 12 and the power buffer circuit 9 with the voltage source inverter 4. Such configuration itself is well known in Japanese Patent Application Laid-Open No. 2011-193678, Ohnuma, Itoh, "Circuit Configuration and Control Strategy of single-to-three Phase Power Converter with Active Buffer and Charging Circuit", The 2010 Annual Meeting of The Institute of Electrical Engineers of Japan, 4-057 (2010) and the like.

An input side of the rectifier circuit 12 is connected to a single-phase AC power supply 10. The rectifier circuit 12 and the power buffer circuit 9 are connected to the voltage source inverter 4 in parallel to each other by the DC bus lines LH and LL, which function as the DC link 7. A potential higher than to the DC bus line LL is applied to the DC bus line LH.

The rectifier circuit 12 includes diodes D21 to D24, which compose a bridge circuit. The rectifier circuit 12 performs the single-phase full-wave rectification for a single-phase AC voltage Vin inputted from the single-phase AC power supply 10, converts the single-phase AC voltage Vin into a rectified voltage Vrec (=|Vin|), and outputs the rectified voltage Vrec to the DC bus lines LH and LL. The rectifier circuit 12 receives a current irec from the single-phase AC power supply 10.

Since the configuration and operations of the voltage source inverter 4 are the same as those in the first embodiment, a description thereof will be omitted here.

The power buffer circuit 9 includes a capacitor 90, a discharge circuit 91 and a charging circuit 92, and exchanges power with the DC bus lines LH and LL. The charging circuit 92 boosts the rectified voltage Vrec, and charges the capacitor 90. The discharge circuit 91 discharges the capacitor 90.

The discharge circuit 91 includes a diode D92 and a transistor (here, insulated gate bipolar transistor: hereinafter abbreviated as "IGBT") Sc connected in antiparallel thereto. The transistor Sc is connected in series to the capacitor 90 between the DC bus lines LH and LL on the DC bus line LH side. The transistor Sc and the diode D92 can be collectively regarded as a single switch Sc. By conduction of the switch Sc, the capacitor 90 is discharged, and gives power between the DC bus lines LH and LL. Opening and closing of the switch Sc is controlled by a signal SSc from the control device 6.

For example, the charging circuit 92 includes a diode D90, a reactor L9, and a transistor (here, IGBT) Sl. The diode D90 includes a cathode and an anode, and the cathode is connected between the switch Sc and the capacitor 90. Such a configuration is known as a so-called boost chopper. A diode D91 is connected in antiparallel to the transistor Sl, and both of them can be collectively regarded as such a single switch Sl.

The capacitor 90 is charged by the charging circuit 92, and a both-end voltage Vc (hereinafter, also referred to as "boosted voltage Vc") higher than the rectified voltage Vrec is generated in the capacitor 90. That is, the power buffer circuit 9 functions as a booster circuit, and whether or not the boosted voltage Vc contributes to the link voltage Vdc is determined by the switch Sc.

More specifically, when the switch Sc is nonconductive, the rectified voltage Vrec is adopted as the link voltage Vdc. When the switch Sc conducts, the boosted voltage Vc is adopted as the link voltage Vdc since the boosted voltage Vc is higher than the rectified voltage Vrec.

Figure 8:
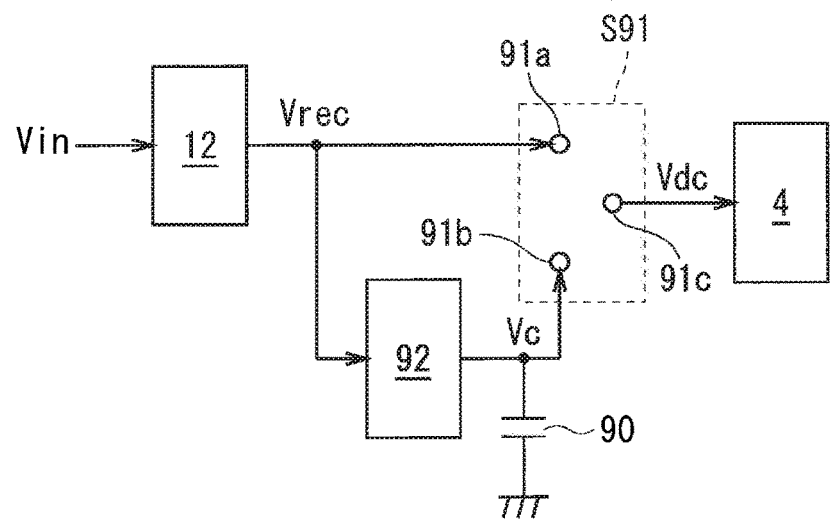
FIG. 8 is a block diagram schematically showing a relationship among a rectified voltage, a boosted voltage and a DC voltage.

FIG. 8 is a block diagram schematically showing a relationship among the rectified voltage Vrec, the boosted voltage Vc, and the link voltage Vdc while particularly focusing on the voltage. The rectifier circuit 12 generates the rectified voltage Vrec from the single-phase AC voltage Vin, and the rectified voltage Vrec is given to one end 91a of the switch S91 and the charging circuit 92. The charging circuit 92 charges the capacitor 90 to the boosted voltage Vc, and the boosted voltage Vc is given to other end 91b of the switch S91. A common end 91c of the switch S91 outputs the link voltage Vdc to the voltage source inverter 4.

The fact that the common end 91c and one end 91a are connected to each other in the switch S91 corresponds to the fact that the switch Sc is nonconductive, and the fact that the common end 91c and the other end 91b are connected to each other corresponds to the fact that switch Sc is conductive. As described above, the link voltage Vdc is obtained by exclusively adopting the rectified voltage Vrec and the boosted voltage Vc.

Figure 9:
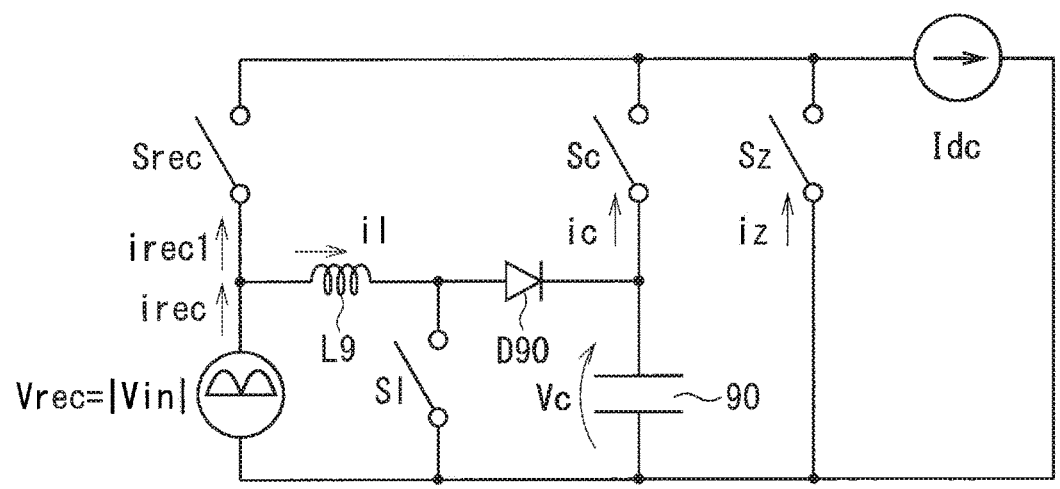
FIG. 9 is a circuit diagram showing an equivalent circuit of the direct AC power conversion device.

FIG. 9 is a circuit diagram showing an equivalent circuit of the circuit shown in FIG. 7 while focusing on a current thereof. In this equivalent circuit, a current irec1 is represented equivalently as a current irec1 passing through a switch Srec when the switch Srec conducts. In a similar way, a discharge current ic is represented equivalently as a current passing through a switch Sc when the switch Sc conducts.

Moreover, the current flowing to the load 3 via the voltage source inverter 4 when the connecting points Pu, Pv and Pw in the voltage source inverter 4 are commonly connected to either one of the DC bus lines LH and LL is also equivalently represented as a zero-phase current iz flowing through the switch Sz. Moreover, in FIG. 9, the reactor L9, the diode D90 and the switch Sl, which compose the charging circuit 92, are shown, and a current it flowing through the reactor L9 is additionally written.

In the equivalent circuit thus obtained, duties drec, dc and dz, at which the switches Srec, Sc and Sz conduct, are introduced, and drec+dc+dz=1 is established. Here, drec, dc and dz range as 0≤drec≤1, 0≤dc≤1, and 0≤dz≤1.

The link current Idc is the sum of the currents irec1, ic and iz, which flows through the switches Srec, Sc and Sz to conduct, respectively. Moreover, since the currents irec1, ic and iz are obtained by multiplying the link current Idc by the duties drec, dc and dz, respectively, these currents irec1, ic and iz are average values in switching cycles of the switches Srec, Sc and Sz.

The duty drec is a duty that sets a period while the rectifier circuit 12 is capable of flowing the current to the voltage source inverter 4, and accordingly, is referred to as the rectification duty drec. Moreover, the duty dc is a duty at which the capacitor 90 is discharged, and accordingly, is referred to as the discharge duty dc. Furthermore, the duty dz is a duty at which the zero-phase current iz always flows in the voltage source inverter 4 regardless of the voltage outputted therefrom, and accordingly, is referred to as the zero duty dz.

Note that the switch Sl conducts by an activated signal SSl, the signal SSl being based on a charging duty dl, and accumulates energy in the reactor L9 by flowing the current it through the reactor L9. The switch Sl is nonconductive, whereby the capacitor 90 is charged via the diode D90. In other words, a duty with which the capacitor 90 is charged is complementary to the charging duty dl.

Examples of the operations of the power buffer circuit 9 having such a configuration, the equivalent circuit shown in FIG. 9, and specific settings of the variety of duties mentioned above are described in detail in Japanese Patent Application Laid-Open No. 2011-193678 and Ohnuma, Itoh, "Circuit Configuration and Control Strategy of single-to-three Phase Power Converter with Active Buffer and Charging Circuit", The 2010 Annual Meeting of The Institute of Electrical Engineers of Japan, 4-057 (2010), and accordingly, a detailed description thereof will be omitted here.

However, as understood from the configuration of FIG. 7 and the fact that the boosted voltage Vc is adopted as the link voltage Vdc only when the switch Sc conducts, the (equivalent) switch Srec itself does not function actively, but passively functions by the operation of the switch Sc. Hence, it can be understood that the switch S91 in FIG. 8 schematically shown from the viewpoint of voltage is unifying the switches Sc and Sz of FIG. 9 equivalently shown from the viewpoint of current.

That is, it can be regarded that, in the switch S91, a duty at which the common end 91c and other end 91b thereof are connected to each other is equal to the discharge duty dc, and a duty at which the common end 91c and the one end 91a are connected to each other is equal to a sum of the rectification duty drec and the zero duty dz.

Note that it is additionally mentioned that, in Japanese Patent Application Laid-Open No. 2011-193678 and Ohnuma, Itoh, "Circuit Configuration and Control Strategy of single-to-three Phase Power Converter with Active Buffer and Charging Circuit", The 2010 Annual Meeting of The Institute of Electrical Engineers of Japan, 4-057 (2010), an average value of the link voltage Vdc is used in consideration of the case where the currents irec1 and is do not flow so as to correspond to the zero duty dz, and is different from such an instantaneous link voltage Vdc described by using the switch S91.

Figure 10:
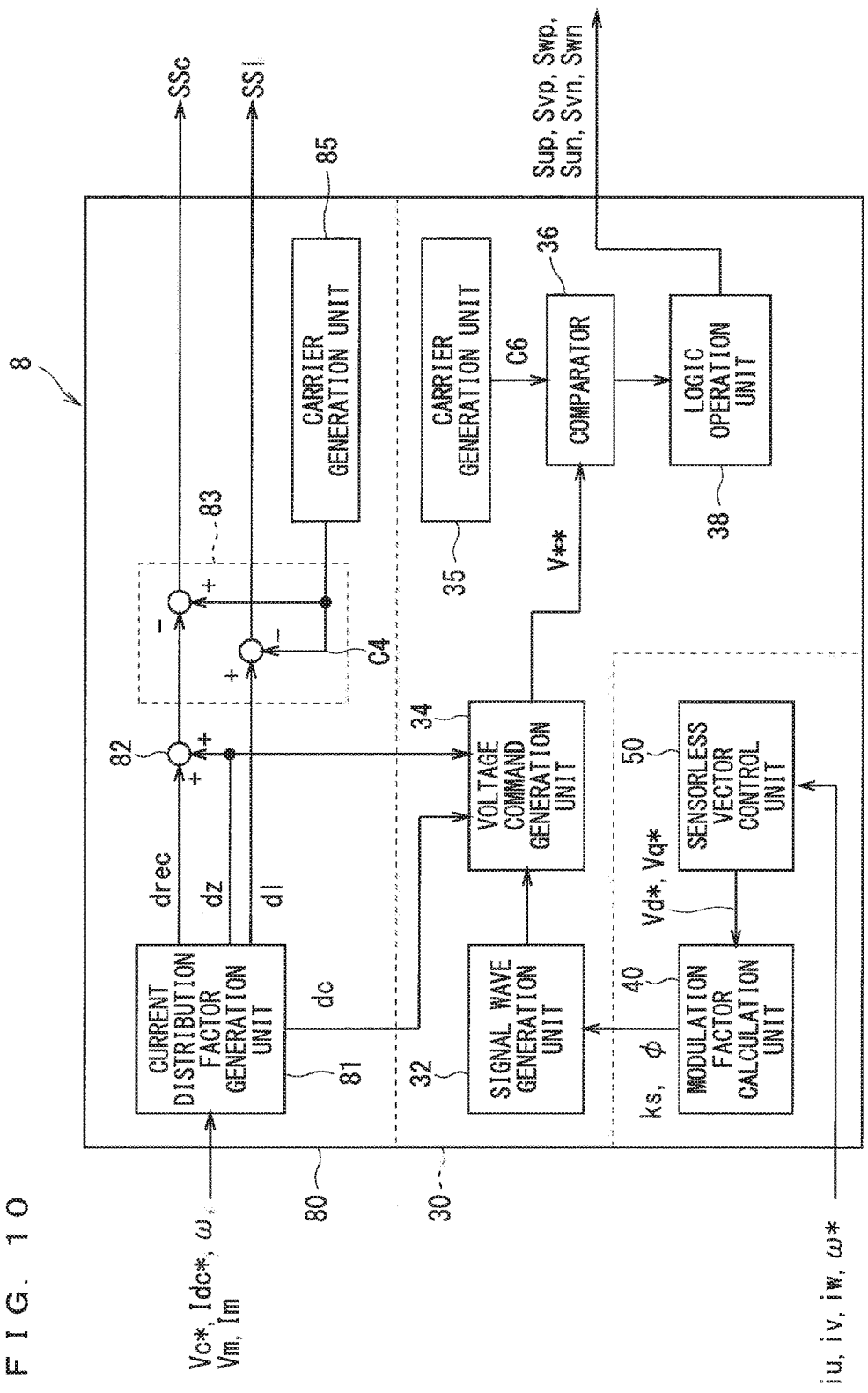
FIG. 10 is a block diagram illustrating the configuration of the control device.

FIG. 10 is a block diagram illustrating a configuration of the control device 8. The control device 8 includes a converter control unit 80, an inverter control unit 30, a modulation factor calculation unit 40, and a sensorless vector control unit 50. Configurations and operations of the inverter control unit 30, the modulation factor calculation unit 40 and the sensorless vector control unit 50 are the same as those of the control device 6, and accordingly, a detailed description thereof is omitted here except for the operations of the voltage command generation unit 34. The operations of the voltage command generation unit 34 will be described later.

Note that a carrier generation unit 35 outputs a carrier C6, and gives the carrier C6 to the comparator 36. A shape of the carrier C6 will be described later. However, a cycle of the carrier C6 is equal to the cycle T0 of the carrier C4. The comparator 36 operates in a similar way to the first embodiment.

The converter control unit 80 includes a current distribution factor generation unit 81, an adder 82, a comparator 83, and a carrier generation unit 85.

On the basis of a variety of amounts, the current distribution factor generation unit 81 generates the rectification duty drec, the discharge duty dc, the zero duty dz and the charging duty dl, and outputs these. As the variety of amounts, for example, there are illustrated a command value Vc* of the boosted voltage Vc, a command value Idc* of the link current Idc, a rotational angular velocity ω and peak value Vm of the single-phase AC voltage Vin, and a peak value Im of the current irec.

The adder 82 outputs a sum of the rectification duty drec and the zero duty dz. This sum is compared with the carrier C4 in the comparator 83, and a result of the comparison is adopted as the signal SSc. The comparator 83 further compares the charging duty dl and the carrier C4 with each other, and a result of the comparison is adopted as the signal SSl.

The carrier C4 is generated by the carrier generation unit 85. In a similar way to the first embodiment, the carrier C4 adopts such a sawtooth wave, which has a cycle T0, a minimum value 0, and a maximum value 1, rises gradually, and falls steeply. That is, the carrier generation unit 85 can adopt the same configuration as that of the carrier generation unit 25. Also in this embodiment, a description will be made while taking as an example the case where the sawtooth wave rises gradually and falls steeply; however, it is obvious that the description is also applicable to the case where the sawtooth wave falls gradually and rises steeply if the discharge duty dc is considered to be swapped for the sum of the rectification duty drec and the zero duty dz.

The discharge duty dc and the zero duty dz are inputted to the voltage command generation unit 34. As mentioned above, there is such a relationship of drec+dc+dz=1, and accordingly, the rectification duty drec may be inputted to the voltage command generation unit 34 in place of the zero duty dz.

In a similar way to the control device 6, the control device 8 is composed by including a microcomputer and a storage device. The microcomputer executes respective processing steps (in other words, procedures) written in a program. It can also be understood that the microcomputer functions as a variety of means corresponding to the respective processing steps written in the program, or alternatively, it can also be understood that the microcomputer realizes a variety of functions corresponding to the respective processing steps. Moreover, the control device 8 is not limited to this, and some or all of a variety of such procedures executed by the control device 8 or the variety of means or the variety of functions, which are realized thereby, may be realized by hardware.

E. Explanation of Voltage Command Group.

Figure 11:
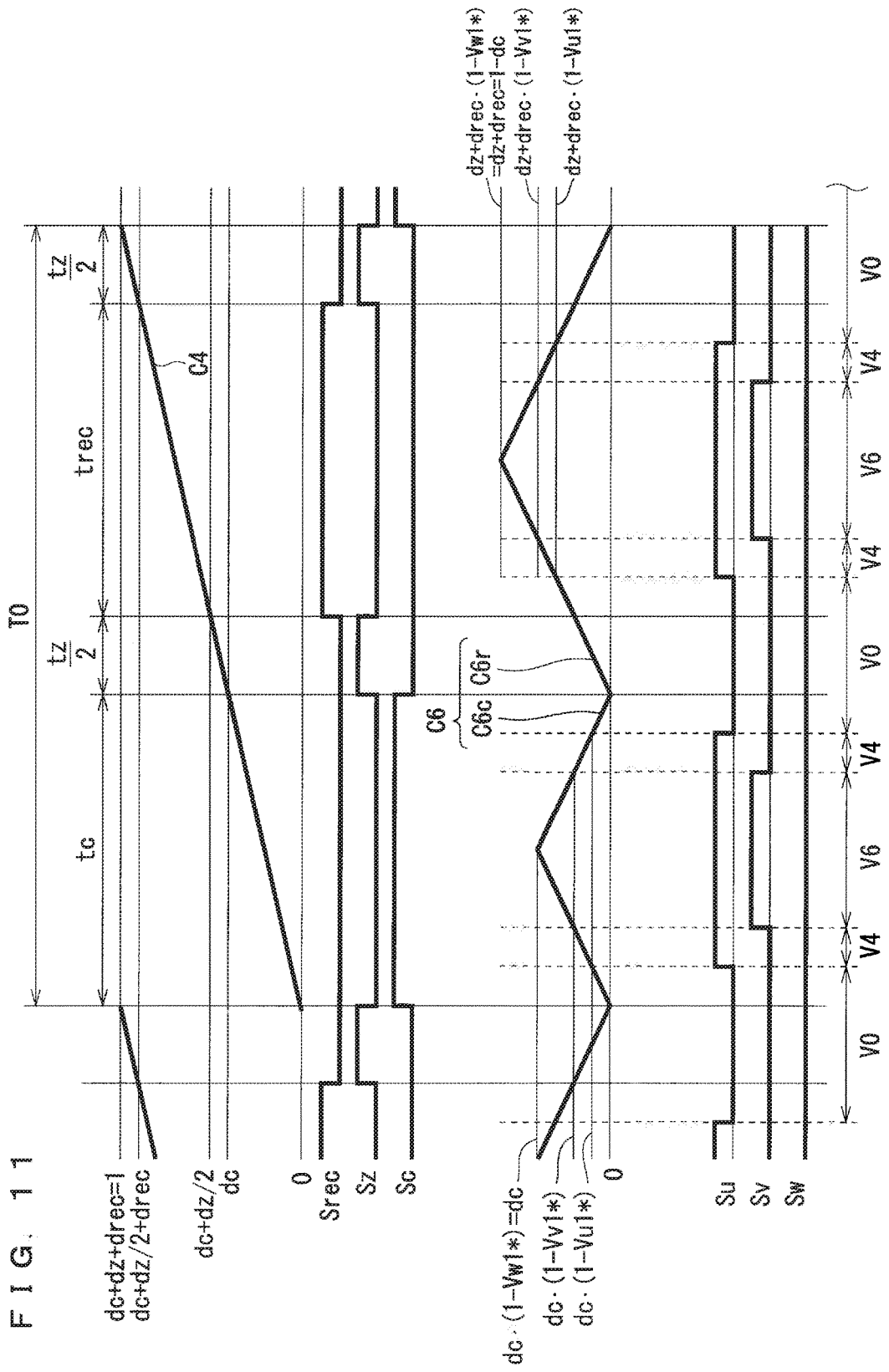
FIGS. 11 and 12 are graphs explaining a second embodiment.
Figure 12:
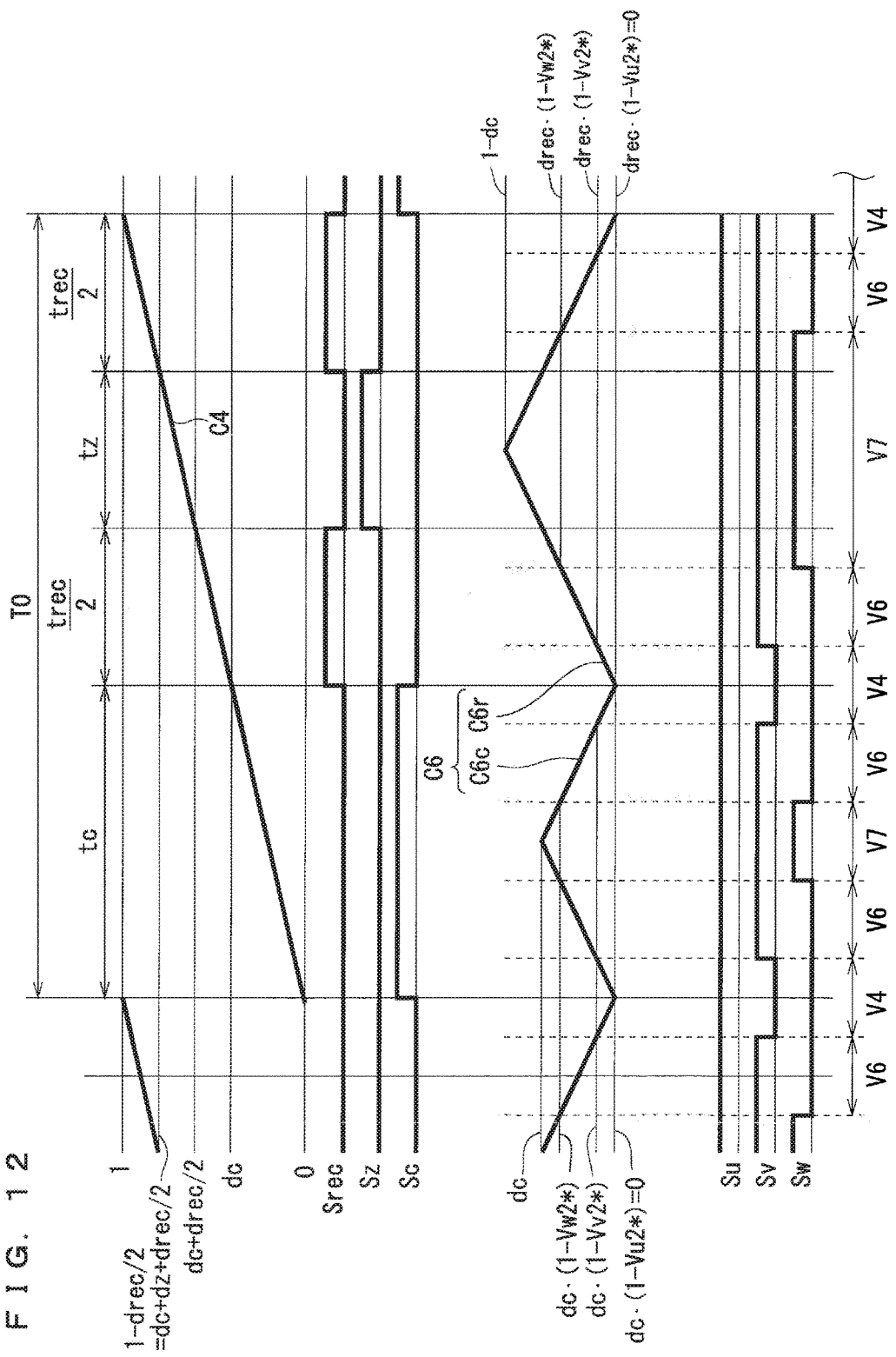

Each of FIG. 11 and FIG. 12 is a graph showing a state in which the carrier C6 and the voltage command group V** are compared with each other at $0 \le \phi \le \pi/3$, and the active/non-active of the switching signals Sup, Svp and Swp is determined. However, there are also written the operations of the (equivalent) switches Srec and Sz shown in FIG. 9 and the switch Sc of the discharge circuit 13, and the carrier C4 and the two duties, which determine these operations.

ON/OFF of the switches Srec, Sc and Sz are individually indicated by high/low of graphs. The cycle T0 of the carrier C4 is divided by a ratio of the rectification duty drec, the discharge duty dc, and the zero duty dz.

As mentioned above, the rectification duty drec is passively determined by the discharge duty dc and the zero duty dz. Accordingly, the discharge duty dc is adopted as a comparison object of the carrier C4.

FIG. 11 and FIG. 12 correspond to FIG. 5 and FIG. 6, which are shown in the first embodiment, respectively. That is, FIG. 11 shows operations of a third two-phase modulation mode adopted in the vicinity of 0° where the period τ6 is shortened. FIG. 12 shows operations of a fourth two-phase modulation mode adopted in the vicinity of 60° where the period τ6 is shortened.

The carrier C6 is a triangular wave, and in one cycle thereof, exhibits the minimum value Cmin twice, the first maximal value Cmax1 once, and the second maximal value Cmax2 once.

The carrier C6 is divided into a portion C6r continuous in the first period of the length (1−dc)·T0 and a portion C6c continuous in the second period of the length dc·T0.

Each of the portions C6r and C6s is a symmetric triangular wave, and takes the minimum value Cmin. The portion C6r takes the first maximal value Cmax1, and the portion C6c takes the second maximal value Cmax2. (Cmax1−Cmin):(Cmax2−Cmin)=(1−dc):dc is established. Here, a variation width ΔD is introduced in a similar way to the first embodiment, whereby Cmax1−Cmin=ΔD·(drt+Dz)=ΔD·(1−dc) and Cmax2−Cmin=ΔD·dc can be established. That is, ΔD=Cmax1+Cmax2−2·Cmin is established.

However, each of FIG. 11 and FIG. 12 illustrates a case where ΔD=1 and Cmin=0 in each of these: the first maximal value Cmax1 appears as the value (1−dc); and the second maximal value Cmax2 appears as the discharge duty dc. The value (1−dc) is a duty with which the switch Sc is nonconductive, and is equal to the sum of the rectification duty drec and the zero duty dz. Hereinafter, the value (1−dc) is also referred to as a discharge complementation duty.

The carrier C6 takes the minimum value Cmin at a first point of time of shifting from the second period to the first period and at a second point of time of shifting from the first period to the second period, and the portions C6r and C6s are continuous with each other at the first point of time and the second point of time. Specifically, the carrier C6 increases after taking the minimum value Cmin at the second point of time to reach the second maximal value Cmax2 at the portion C6c, then the carrier C6 decreases to take the minimum value Cmin thereof at the first point of time. Thereafter, the carrier C6 continues to increase until taking the first maximal value Cmax1 in the portion C6r. When the carrier C6 decreases after taking the first maximal value Cmax1 in the portion C6r and reaches the second point of time, the carrier C6 takes the minimum value Cmin.

Also in the third two-phase modulation mode, in a similar way to the first two-phase modulation mode, the period while the zero voltage vector V0 is adopted, the period appearing twice in one cycle of the carrier C6, is adjacently sandwiched by the periods while the unit voltage vector V4 is adopted, whereby the period while the unit voltage vector V6 is adopted will be generated in periods as the rest thereof. In this way, the period while the unit voltage vector V6 is adopted is divided into no more than two in one cycle of the carrier C6.

Also in the fourth two-phase modulation mode, in a similar way to the second two-phase modulation mode, the period while the zero voltage vector V7 is adopted, the period appearing twice in one cycle of the carrier C6, is adjacently sandwiched by the periods while the unit voltage vector V6 is adopted, whereby the period while the unit voltage vector V4 is adopted will be generated in periods as the rest thereof. In this way, the period while the unit voltage vector V4 is adopted is divided into no more than two in one cycle of the carrier C6.

Hereinafter, for each of the third two-phase modulation mode (refer to FIG. 11) and the fourth two-phase modulation mode (refer to FIG. 12), a description will be made of such a voltage command group V**, which is required for being the unit voltage vectors arranged as mentioned above, and obtaining the above-mentioned (i) to (iv).

FIG. 11 is a graph for a case where the third two-phase modulation mode is adopted, showing a state in which the carrier C6 and the voltage command group V** are compared with each other at $0 \le \phi \le \pi/3$, and the active/non-ative of the switching signals Sup, Svp and Swp is determined. However, the carrier C4 and the discharge duty dc and values (dc+dz/2+drec) and (dc+dz/2) are also written.

The cycle T0 is divided by periods tc (=dc·T0) and trec (=drec·T0) and a pair of periods tz/2(=dz·T0/2). That is, a period while the carrier C4 becomes equal to or less than the discharge duty dc is the period tc, and a period while the carrier C4 becomes equal to or more than the value (dc+dz/2) and becomes a value equal to or less than (dc+dz/2+drec) is the period trec. A period while the carrier C4 becomes equal to or larger than the discharge duty dc and equal to or less than the value (dc+dz/2) and a period while the carrier C4 becomes equal to or larger than the value (dc+dz/2+drec) exist as a pair of the periods tz/2.

In the third two-phase modulation mode, the period tc corresponds to the second period described for the current source converter 2 of the direct AC power conversion device 100. The period trec and the pair of periods tz/2 collectively correspond to the first period described for the current source converter 2. Considering such a correspondence, the first state and the second state, which are described for the current source converter 2, correspond to a state in which the switch Sc is nonconductive and a state in which the switch Sc is conductive, respectively. Hence, it can be understood that whether or not the boosted voltage Vc is adopted for the link voltage Vdc is switched at a boundary between the first period and the second period.

As mentioned above, timing of such switching is determined by the carrier C4 and the discharge duty dc. A desirable way of selecting this discharge duty de is well known in Japanese Patent Application Laid-Open No. 2011-193678 and Ohnuma, Itoh, "Circuit Configuration and Control Strategy of single-to-three Phase Power Converter with Active Buffer and Charging Circuit", The 2010 Annual Meeting of The Institute of Electrical Engineers of Japan, 4-057 (2010), and accordingly, a description thereof is omitted here.

The third two-phase modulation mode is adopted when the phase angle 41 is less than 60° and close to 0°, and accordingly, those generated on the basis of the signal wave group V1* are adopted as the voltage command group V. Specifically, the voltage command group V includes the following six voltage commands in a similar way to the first two-phase modulation:

First voltage command: $C\text{max1} - \Delta D \cdot (1 - dz - dc) \cdot Vu1^*$ $= C\text{max1} - \Delta D \cdot drec \cdot Vu1^*$ $= (C\text{max1} - C\text{min}) + C\text{min} - \Delta D \cdot drec \cdot Vu1^*$ $= C\text{min} + \Delta D \cdot \{dz + drec(1 - Vu1^*)\},$ Second voltage command: $C\text{max1} - \Delta D \cdot (1 - dz - dc) \cdot Vv1^*$ $= C\text{max1} - \Delta D \cdot drec \cdot Vv1^*$ $= (C\text{max1} - C\text{min}) + C\text{min} - \Delta D \cdot drec \cdot Vv1^*$ $= C\text{min} + \Delta D \cdot \{dz + drec(1 - Vv1^*)\},$ Third voltage command: $C\text{max1} - \Delta D \cdot (1 - dz - dc) \cdot Vw1^*$ $= C\text{max1} - \Delta D \cdot drec \cdot Vw1^*$ $= (C\text{max1} - C\text{min}) + C\text{min} - \Delta D \cdot drec \cdot Vw1^*$ $= C\text{min} + \Delta D \cdot \{dz + drec(1 - Vw1^*)\},$ Fourth voltage command: $C\text{min} + \Delta D \cdot dc \cdot (1 - Vu1^*),$ Fifth voltage command: $C\text{min} + \Delta D \cdot dc \cdot (1 - Vv1^*),$ Sixth voltage command: $C\text{min} + \Delta D \cdot dc \cdot (1 - Vw1^*).$ Note that, at $0 \le \phi \le \pi/3$, Vw1*=0 is established as shown in Expression (9), and accordingly, the third voltage command is equal to the first maximal value Cmax1, and the sixth voltage command is equal to the second maximal value Cmax2 (FIG. 11 illustrates the case of Cmax1=1−dc and Cmax2=dc, and accordingly, the third voltage command and the sixth voltage command appear as the discharge complementation duty (1−dc) and the discharge duty dc, respectively).

Then, when the portion C6r is larger than the first voltage command Cmax1−ΔD·(1−dz−dc)·Vu1*, and when the portion C6c is larger than the fourth voltage command Cmin+ΔD·dc·(1−Vu1*), the switching signal Sup is active, and the switch Qup is caused to conduct. When the portion C6r is larger than the second voltage command Cmax1−ΔD·(1−dz−dc)·Vv1*, and when the portion C6c is larger than the fifth voltage command Cmin+ΔD·dc·(1−Vv1*), the switching signal Svp is active, and the switch Qvp is caused to conduct. When the portion C6r is larger than the third voltage command Cmax1−ΔD·(1−dz−dc)·Vw1*, and when the portion C6c is larger than the sixth voltage command Cmin+ΔD·dc·(1−Vw1*), the switching signal Swp is active, and the switch Qwp is caused to conduct. Here, a reason why the voltage command group V** is shown in a form that does not use the rectification duty drec is that the rectification duty drec is not inputted to the voltage command generation unit 34 with reference to FIG. 10.

From such relationships shown in equations for the first voltage command to the sixth voltage command, it is obvious that the voltage command group V** can be shown without using the zero duty dz.

Such a period while the switching signal Sy is active is calculated by Expression (31).

$$[\{Cmax1-(Cmax1-\Delta D\cdot(1-dz-dc)\cdot Vy1^*)\}+\{Cmax2-\\(Cmin+\Delta D\cdot dc\cdot(1-Vy1^*))\}]\times T0/\Delta D=(1-dz)\\ \cdot Vy1^*\cdot T0 \quad (31).$$

Hence, the voltage command group V is determined as mentioned above, and the switching signal Syp is set as mentioned above by the comparison between the voltage command group V and the carrier C6, whereby (1−dz) times a sum of conduction periods of the switch Qyp, which are set by the signal wave group V1*, is obtained.

Here, when the fact that, in the pair of periods tz/2 corresponding to the zero duty dz, the current is not supplied to the voltage source inverter 4 (refer to FIG. 9) and the link voltage Vdc is not used in the voltage source inverter 4 is taken into consideration, then it is not regarded as a problem that the conduction period of the switch Qyp, which is determined by the third two-phase modulation mode, is (1−dz) times the conduction period set by the signal wave group V1*.

Note that, at $0 \leq \phi \leq \pi/3$, Vw1*=0 is established as shown in Expression (9), and accordingly, the non-active of the switching signal Swp is maintained.

As described above, in a similar way to the first two-phase modulation mode, in the third two-phase modulation mode, the periods while the unit voltage vector V6 is adopted are obtained as continuous periods individually in the first period and the second period. Hence, it is easy to obtain a period necessary to measure the link current Idc in the period while the unit voltage vector V6 is adopted.

FIG. 12 is a graph for a case where the fourth two-phase modulation mode is adopted, showing a state in which the carrier C6 and the voltage command group V** are compared with each other at $0 \leq \phi \leq \pi/3$, and the active/non-active of the switching signals Sup, Svp and Swp is determined. However, the carrier C4 and the discharge duty dc and values (1−drec/2) and (dc+drec/2) are also written.

In the fourth two-phase modulation mode, the cycle T0 is divided by periods tc (=dc·T0), a pair of periods trec/2 (=drec·T0/2) and a period tz (=dz·T0). The period tc is a period while the carrier C4 becomes equal to or less than the discharge duty dc, and is the same as the period tc adopted in the third two-phase modulation mode. On the other hand, a period while the carrier C4 becomes equal to or larger than the value (dc+drec/2) and equal to or less than the value (1−drec/2) is the period tz. A period while the carrier C4 becomes equal to or larger than the discharge duty dc and equal to or less than the value (dc+drec/2) and a period while the carrier C4 becomes equal to or larger than the value (1−drec/2) exist as a pair of the periods trec/2.

Also in the fourth two-phase modulation mode, the period tc corresponds to the second period described for the current source converter 2 of the direct AC power conversion device 100; however, it is a collection the period tz and the pair of periods trec/2 that corresponds to the first period. Considering such a correspondence, the first state and the second state, which are described for the current source converter 2, correspond to a state in which the switch Sc is nonconductive and a state in which the switch Sc is conductive, respectively. Hence, also in the fourth two-phase modulation mode, it can be understood that whether or not the boosted voltage Vc adopts the link voltage Vdc is switched at such a boundary between the first period and the second period.

The fourth two-phase modulation mode is adopted when the phase angle φ is less than 60° and close to 60°, and accordingly, those generated on the basis of the signal wave group V2* are adopted as the voltage command group V. Specifically, the voltage command group V includes the following six voltage commands:

First voltage command; Cmin+ΔD·drec·(1−Vu2*)=Cmin+ΔD·(1−dc−dz)·(1−Vu2*),
Second voltage command; Cmin+ΔD·drec·(1−Vv2*)=Cmin+ΔD·(1−dc−dz)·(1−Vv2*),
Third voltage command; Cmin+ΔD·drec·(1−Vw2*)=Cmin+ΔD·(1−dc−dz)·(1−Vw2*),
Fourth voltage command; Cmin+ΔD·dc·(1−Vu2*),
Fifth voltage command; Cmin+ΔD·dc·(1−Vv2*),
Sixth voltage command; Cmin+ΔD·dc·(1−Vw2*).

Then, when the portion C6r is larger than the first voltage command Cmin+ΔD·(1−dc−dz)(1−Vu2*), and when the portion C6c is larger than the fourth voltage command Cmin+ΔD·dc·(1−Vu2*), the switching signal Sup is active, and the switch Qup is caused to conduct. When the portion C6r is larger than the second voltage command Cmin+ΔD·(1−dc−dz)(1−Vv2*), and when the portion C6c is larger than the fifth voltage command Cmin+ΔD·dc·(1−Vv2*), the switching signal Svp is active, and the switch Qvp is caused to conduct. When the portion C6r is larger than the third voltage command Cmin+ΔD·(1−dc−dz)(1−Vw2*), and when the portion C6c is larger than the sixth voltage command Cmin+ΔD·dc·(1−Vw2*), the switching signal Svp is active, and the switch Qvp is caused to conduct. Here, a reason why the voltage command group V** is shown in a form that does not use the rectification duty drec is that the rectification duty drec is not inputted to the voltage command generation unit 34 with reference to FIG. 10.

From such relationships shown in equations for the first voltage command to the sixth voltage command, it is obvious that the voltage command group V** can be shown without using the zero duty dz.

Such a period while the switching signal Sy is active is calculated by Expression (32).

$$[\{Cmax1-(Cmin+\Delta D\cdot(1-dc-dz)\cdot(1-Vy2^*))\}+\\ \{Cmax2-(Cmin+\Delta D\cdot dc\cdot(1-Vy2^*))\}]\times T0/\Delta D=\\ [(1-dz)Vy2^*+dz]\cdot T0 \quad (32).$$

Hence, the voltage command group V is determined as mentioned above, and the switching signal Syp is set as mentioned above by the comparison between the voltage command group V and the carrier C6, whereby a sum of the period tz and (1−dz) times a sum of conduction periods of the switch Qyp, which are set by the signal wave group V2*, is obtained.

Here, when the fact that, in the period tz corresponding to the zero duty dz, the current is not supplied to the voltage source inverter 4 (refer to FIG. 9) and the link voltage Vdc is not used in the voltage source inverter 4 is taken into consideration, then it is not regarded as a problem that the conduction period of the switch Qyp, which is determined by the fourth two-phase modulation mode, is different as mentioned above from the conduction period set by the signal wave group V2*.

Note that, since Vu2*=1 is established at $0 \leq \phi \leq \pi/3$ as shown in Expression (16), both of the first voltage command and the fourth voltage command become equal to the value Cmin (these values are equal to 0 since FIG. 12 illustrates a case of Cmin=0), and the activity of the switching signal Sup is maintained.

As described above, in a similar way to the second two-phase modulation mode, in the fourth two-phase modulation mode, the periods while the unit voltage vector V4 is adopted are obtained as continuous periods individually at the first point of time and the second point of time. Hence, it is easy to obtain such a period necessary to measure the link current Idc in the period while the unit voltage vector V4 is adopted.

The voltage command group V** is set as described above, whereby the above-described (i) to (iv) are satisfied.

In the third two-phase modulation mode, timing at which the switch Sc is switched is included in the period while the zero voltage vector V0 is adopted for the operation of the voltage source inverter 4. This is desirable from a viewpoint of avoiding a switching loss of the switch Sc.

F. Comparison among the first to fourth two-phase modulation modes.

The first and second two-phase modulation modes described in the first embodiment are adopted for the direct AC power conversion device 100 including the current source converter 2 as the supply source of the link voltage Vdc. The third and fourth two-phase modulation modes described in the second embodiment are adopted for the direct AC power conversion device 200 including the rectifier circuit 12 and the power buffer circuit 9 as the supply source of the link voltage Vdc. Hence, the first and second two-phase modulation modes and the third and fourth two-phase modulation modes can be represented by a common concept though the voltage command groups V** thereof are different from each other. Hereinafter, a description will be made of such common points and such different points while making comparison.

(f-1) First two-phase modulation mode and third two-phase modulation mode.

The carrier C5 to be compared with the voltage command group V in the first two-phase modulation mode and the carrier C6 to be compared with the voltage command group V in the third two-phase modulation mode are common to each other in that both are triangular wave and each thereof exhibits, per cycle, the minimum value Cmin twice, the first maximal value (Cmax1) once, and the second maximal value (Cmax2) once.

These two two-phase modulation modes are common to each other in that each of the first voltage command, the second voltage command and the third voltage command takes such a value obtained by subtracting a product of the signal wave Vy1* of the signal wave group V1* and a first multiplier from the first maximal value Cmax1. Here, the first multiplier is $\Delta D \cdot drt$ in the first two-phase modulation mode, and is $\Delta D \cdot drec$ in the third two-phase modulation method, and both are non-negative.

Moreover, these two two-phase modulation modes are common to each other in that each of the fourth voltage command, the fifth voltage command and the sixth voltage command takes such a value obtained by adding a product of the value (1−Vy1*) and a second multiplier to the minimum value Cmin, the value (1−Vy1*) being obtained by subtracting, from 1, the signal wave Vy1* of the signal wave group V1*. Here, the second multiplier is $\Delta D \cdot dst$ in the first two-phase modulation mode, and is $\Delta D \cdot dc$ in the third two-phase modulation method, and both are non-negative.

Then, these two two-phase modulation modes are common to each other also in that the switching signal Sup is active when the carrier C5 (or the carrier C6) is larger than the first voltage command and when the carrier C5 (or the carrier C6) is larger than the fourth voltage command. The same also applies to the switching signals Svp and Swp.

However, in the first two-phase modulation mode, the sum of the first multiplier $\Delta D \cdot drt$ and the second multiplier $\Delta D \cdot dst$ is equal to the variation width $\Delta D \cdot (= Cmax1 + Cmax2 - 2 \cdot Cmin)$, and meanwhile, in the third two-phase modulation mode, the sum of the first multiplier $\Delta D \cdot drec$ and the second multiplier $\Delta D \cdot dc$ becomes equal to or less than the variation width $\Delta D$. This is because the zero duty dz is non-negative, and if the zero duty dz is zero, then the sum of the first multiplier $\Delta D \cdot drec$ and the second multiplier $\Delta D \cdot dc$ becomes equal to the variation width $\Delta D$ even in the third two-phase modulation mode.

(f-2) Second two-phase modulation mode and fourth two-phase modulation mode.

Commonality of the carriers C5 and C6, which are adopted in these two two-phase modulation modes, is as described in (f-1).

These two two-phase modulation modes are common to each other in that each of the first voltage command, the second voltage command and the third voltage command takes such a value obtained by adding a product of the value (1−Vy2*) and a first multiplier to the minimum value Cmin, the value (1−Vy2*) being obtained by subtracting, from 1, the signal wave Vy2* of the signal wave group V2*.

Moreover, these two two-phase modulation modes are common to each other in that each of the fourth voltage command, the fifth voltage command and the sixth voltage command takes such a value obtained by adding a product of the value (1-Vy2*) and a second multiplier to the minimum value.

Here, the first multiplier and the second multiplier in the second two-phase modulation mode are the same as those in the first two-phase modulation mode, and the first multiplier and the second multiplier in the fourth two-phase modulation mode are the same as those in the third two-phase modulation mode.

Then, commonality regarding the activation of the switching signals Sup, Svp and Swp in the second two-phase modulation mode and the fourth two-phase modulation mode and a different point regarding the sum of the first multiplier and the second multiplier therein are also similar to the commonality and a different point in the first two-phase modulation mode and the third two-phase modulation mode.

(f-3) Others.

The timing at which the current source converter 2 commutates in the first and second two-phase modulation modes and timing at which the switch Sc is switched in the third and fourth two-phase modulation modes are common to each other in that the timing is timing at which each of the carriers C1, C5 and C6 takes the minimum value Cmin thereof. However, as mentioned above, there is a different point regarding the sum of the first multiplier and the second multiplier.

Although the description has been made of the present invention in detail, the above description is an illustration in all aspects, and the present invention is not limited to this. It is interpreted that unillustrated countless modification examples are imaginable without departing from the scope of the present invention.

The invention claimed is:

1. An inverter control device that controls a voltage source inverter that converts a DC voltage into three-phase AC voltages, wherein said voltage source inverter includes three current paths connected in parallel to one another between first and second DC bus lines to which said DC voltage is applied, in which the potential of the first DC bus line is higher than that of the second DC bus line, each of said current paths includes:
a connecting point for the corresponding current path;
an upper arm-side switch that is connected between said first DC bus line and the connecting point of the corresponding current path and flows a current from said first DC bus line to the connecting point of the corresponding current path at a first time of conduction;
a lower arm-side switch that is connected between the connecting point of the corresponding current path and said second DC bus line and flows a current from the connecting point of the corresponding current path to said second DC bus line at a second time of conduction;
an upper arm-side diode connected in antiparallel to said upper arm-side switch; and
a lower arm-side diode connected in antiparallel to said lower arm-side switch, said inverter control device includes:
a switching signal generation unit that generates a switching signal that causes any one of said upper arm-side switches and said lower arm-side switch to conduct exclusively of each other in each of said current paths while maintaining conduction/nonconduction of said upper arm-side switch in one cycle of a triangular wave on the basis of comparison between said triangular wave and a plurality of voltage commands included in first and second voltage command groups; and
a voltage command generation unit that generates said first and second voltage command groups,
said triangular wave exhibits a minimum value twice, a first maximal value once, and a second maximal value once in said one cycle,
said first voltage command group corresponds to said switching signal in which, in a first section including a first point of time when sums of periods while said upper arm-side switches in a pair of said current paths conduct in said one cycle are equal to each other at zero, a period while said upper arm-side switches in all of said current paths are nonconductive in said one cycle is adjacently sandwiched by a pair of periods while all of said upper arm-side switches in the pair of said current paths are nonconductive and other of said upper arm-side switch conducts, and
said second voltage command group corresponds to said switching signal in which, in a second section exclusive of said first section and including a second point of time when sums of periods while said upper arm-side switches in a pair of said current paths conduct in said one cycle are equal to each other at non-zero, a period while said upper arm-side switches in all of said current paths conduct in said one cycle is adjacently sandwiched by a pair of periods while all of said upper arm-side switches in the pair of said current paths conduct and other of said upper arm-side switch is nonconductive.

2. An inverter control device that controls a voltage source inverter that converts a DC voltage into three-phase AC voltages, wherein
said voltage source inverter includes three current paths connected in parallel to one another between first and second DC bus lines to which said DC voltage is applied, in which the potential of the first DC bus line is higher than that of the second DC bus line,
each of said current paths includes:
a connecting point for the corresponding current path;
an upper arm-side switch that is connected between said first DC bus line and the connecting point of the corresponding current path and flows a current from said first DC bus line to the connecting point of the corresponding current path at a first time of conduction;
a lower arm-side switch that is connected between the connecting point of the corresponding current path and said second DC bus line and flows a current from the connecting point of the corresponding current path to said second DC bus line at a second time of conduction;
an upper arm-side diode connected in antiparallel to said upper arm-side switch; and
a lower arm-side diode connected in antiparallel to said lower arm-side switch, said inverter control device includes:
a switching signal generation unit that generates a switching signal that causes any one of said upper arm-side switches and said lower arm-side switch to conduct exclusively of each other in each of said current paths while maintaining conduction/nonconduction of said upper arm-side switch in one cycle of a triangular wave on the basis of comparison between said triangular wave and a plurality of voltage commands included in first and second voltage command groups; and
a voltage command generation unit that generates said first and second voltage command groups,
said triangular wave exhibits a minimum value twice, a first maximal value once, and a second maximal value once in said one cycle,
said first voltage command group corresponds to said switching signal in which, in a first section including a first point of time when sums of periods while said upper arm-side switches in a pair of said current paths conduct in said one cycle are equal to each other at zero, a period while said upper arm-side switches in all of said current paths are nonconductive in said one cycle is adjacently sandwiched by a pair of periods while all of said upper arm-side switches in the pair of said current paths are nonconductive and other of said upper arm-side switch conducts, and
said second voltage command group corresponds to said switching signal in which, in a second section exclusive of said first section and including a second point of time when sums of periods while said upper arm-side switches in a pair of said current paths conduct in said one cycle are equal to each other at non-zero, a period while said upper arm-side switches in all of said current paths conduct in said one cycle is adjacently sandwiched by a pair of periods while all of said upper arm-side switches in the pair of said current paths conduct and other of said upper arm-side switch is nonconductive,
a signal wave generation unit that outputs a first signal wave group and a second signal wave group, each of which includes a first signal wave indicating a first ratio, to said one cycle, of a first sum of periods while said upper arm-side switch in a first one of said current paths conducts in said one cycle, a second signal wave indicating a second ratio, to said one cycle, of a second sum of periods while said upper arm-side switch in a second one of said current paths conducts in said one cycle, and a third signal wave indicating a third ratio, to said one cycle, of a third sum of periods while said upper arm-side switch in a third one of said current paths conducts in said one cycle,
wherein said voltage command generation unit generates said first voltage command group and said second voltage command group on the basis of said first signal wave group and said second signal wave group, respectively, and said first to third signal waves included in said second signal wave group take values obtained by subtracting, from 1, values in which phases are shifted by 180 degrees from said first to third signal waves included in said first signal wave group, respectively.

3. The inverter control device according to claim 2, wherein said plurality of voltage commands included in said first voltage command group are:

a first voltage command that takes a first value obtained by subtracting from said first maximal value, a product of a first multiplier and said first signal wave of said first signal wave group;

a second voltage command that takes a second value obtained by subtracting, from said first maximal value, a product of said first multiplier and said second signal wave of said first signal wave group;

a third voltage command that takes a third value obtained by subtracting, from said first maximal value, a product of said first multiplier and said third signal wave of said first signal wave group;

a fourth voltage command that takes a fourth value obtained by adding, to a minimum value of said triangular wave, a product of a second multiplier and a first value obtained by subtracting, from 1, said first signal wave of said first signal wave group;

a fifth voltage command that takes a fifth value obtained by adding, to said minimum value, a product of said second multiplier and a second value obtained by subtracting, from 1, said second signal wave of said first signal wave group; and a sixth voltage command that takes a sixth value obtained by adding, to said minimum value, a product of said second multiplier and a third value obtained by subtracting, from 1, said third signal wave of said first signal wave group, said switching signal:

in a first period while said triangular wave departs from said minimum value, passes via said first maximal value and reaches said minimum value one more time, causes said upper arm-side switch in said first current path to conduct when said triangular wave is larger than said first voltage command, causes said upper arm-side switch in said second current path to conduct when said triangular wave is larger than said second voltage command, and causes said upper arm-side switch in said third current path to conduct when said triangular wave is larger than said third voltage command, and in a second period while said triangular wave departs from said minimum value, passes via said second maximal value and reaches said minimum value one more time, causes said upper arm-side switch in said first current path to conduct when said triangular wave is larger than said fourth voltage command, causes upper arm-side switch in said second current path to conduct when said triangular wave is larger than said fifth voltage command, and causes said upper arm-side switch in said third current path to conduct when said triangular wave is larger than said sixth voltage command, both of said first multiplier and said second multiplier are non-negative, and a sum of said first multiplier and second multiplier is equal to or less than a value obtained by subtracting a double of said minimum value from a sum of said first maximal value and said second maximal value.

4. The inverter control device according to claim 2, wherein said plurality of voltage commands included in said second voltage command group are:

a first voltage command that takes a first value obtained by adding, to a minimum value of said triangular wave, a product of a first multiplier and a first value obtained by subtracting, from 1, said first signal wave of said second signal wave group;

a second voltage command that takes a second value obtained by adding, to said minimum value, a product of said first multiplier and a second value obtained by subtracting, from 1, said second signal wave of said second signal wave group;

a third voltage command that takes a third value obtained by adding, to said minimum value, a product of said first multiplier and a third value obtained by subtracting, from 1, said third signal wave of said second signal wave group;

a fourth voltage command that takes a fourth value obtained by adding, to said minimum value, a product of said first value and a second multiplier;

a fifth voltage command that takes a fifth value obtained by adding, to said minimum value, a product of said second value and said second multiplier; and a sixth voltage command that takes a sixth value obtained by adding, to said minimum value, a product of said third value and said second multiplier, said switching signal:

in a first period while said triangular wave departs from said minimum value, passes via said first maximal value and reaches said minimum value one more time, causes said upper arm-side switch in said first current path to conduct when said triangular wave is larger than said first voltage command, causes said upper arm-side switch in said second current path to conduct when said triangular wave is larger than said second voltage command, and causes said upper arm-side switch in said third current path to conduct when said triangular wave is larger than said third voltage command, and in a second period while said triangular wave departs from said minimum value, passes via said second maximal value and reaches said minimum value one more time, causes said upper arm-side switch in said first current path to conduct when said triangular wave is larger than said fourth voltage command, causes said upper arm-side switch in said second current path to conduct when said triangular wave is larger than said fifth voltage command, and causes said upper arm-side switch in said third current path to conduct when said triangular wave is larger than said sixth voltage command, both of said first multiplier and said second multiplier are non-negative, and a sum of said first multiplier and second multiplier is equal to or less than a value obtained by subtracting a double of said minimum value from a sum of said first maximal value and said second maximal value.

5. The inverter control device according to claim 3, wherein said DC voltage is obtained by a current source converter that commutates when said triangular wave takes said minimum value, and a sum of said first multiplier and said second multiplier is equal to a value obtained by subtracting a double of said minimum value from a sum of said first maximal value and said second maximal value.

6. The inverter control device according to claim 3, wherein said DC voltage is obtained by exclusively adopting a rectified voltage obtained from a rectifier circuit and a boosted voltage obtained from a booster circuit that boosts said rectified voltage, and when said triangular wave takes said minimum value, whether or not to adopt said boosted voltage for said DC voltage is switched.

7. The inverter control device according to claim 4, wherein said DC voltage is obtained by a current source converter that commutates when said triangular wave takes said minimum value, and a sum of said first multiplier and said second multiplier is equal to a value obtained by subtracting a double of said minimum value from a sum of said first maximal value and said second maximal value.

8. The inverter control device according to claim 4, wherein said DC voltage is obtained by exclusively adopting a rectified voltage obtained from a rectifier circuit and a boosted voltage obtained from a booster circuit that boosts said rectified voltage, and when said triangular wave takes said minimum value, whether or not to adopt said boosted voltage for said DC voltage is switched.

* * * * *